(12) United States Patent
Kuroda

(10) Patent No.: US 9,097,511 B2
(45) Date of Patent: Aug. 4, 2015

(54) DISPLACEMENT DETECTING DEVICE WITH A POLARIZATION CHANGE TO A TWICE-DIFFRACTED BEAM

(75) Inventor: Akihiro Kuroda, Kanagawa (JP)

(73) Assignee: DMG MORI SEIKI CO., LTD., Yamatokoriyama-shi (JP)

( * ) Notice: Subject to any disclaimer, the term of this patent is extended or adjusted under 35 U.S.C. 154(b) by 320 days.

(21) Appl. No.: 13/453,109

(22) Filed: Apr. 23, 2012

(65) Prior Publication Data
US 2012/0287441 A1 Nov. 15, 2012

(30) Foreign Application Priority Data
May 11, 2011 (JP) ................................ 2011-106684

(51) Int. Cl.
*G01B 11/02* (2006.01)
*G01D 5/38* (2006.01)

(52) U.S. Cl.
CPC . *G01B 11/02* (2013.01); *G01D 5/38* (2013.01)

(58) Field of Classification Search
CPC .............................. G01D 5/38; G01D 5/34715
USPC ................................ 356/494, 499; 250/237 G
See application file for complete search history.

(56) References Cited

U.S. PATENT DOCUMENTS

| 6,166,817 | A | 12/2000 | Kuroda |
| 6,445,456 | B2 * | 9/2002 | Speckbacher et al. ........ 356/499 |
| 2005/0211887 | A1 * | 9/2005 | Kojima ..................... 250/237 G |
| 2006/0139654 | A1 * | 6/2006 | Takahashi et al. ............ 356/494 |
| 2007/0195334 | A1 | 8/2007 | Tamiya |

FOREIGN PATENT DOCUMENTS

| JP | A-01-269002 | 10/1989 |
| JP | 2007-218833 A | 8/2007 |
| JP | 4023923 B2 | 12/2007 |

* cited by examiner

*Primary Examiner* — Hwa Lee
(74) *Attorney, Agent, or Firm* — Oliff PLC

(57) ABSTRACT

A displacement detecting device includes: a diffraction grating having a relief shape; an irradiation optical system adapted to irradiate two beams onto the diffraction grating as p-polarized light; a reflection optical system adapted to reflect two first diffracted lights generated when the two beams is diffracted by the diffraction grating, and cause the first diffracted lights to be incident again on the diffraction grating as p-polarized light so as to generate two second diffracted lights; an interference optical system adapted to cause the two second diffracted lights to interfere with each other to obtain interference light; a light receiving section adapted to receive the interference light; and a position information detecting section adapted to detect position information of the diffraction grating based on an interference signal. The period of the relief of the diffraction grating is no more than 1.5 times the wavelength of coherent light.

1 Claim, 16 Drawing Sheets

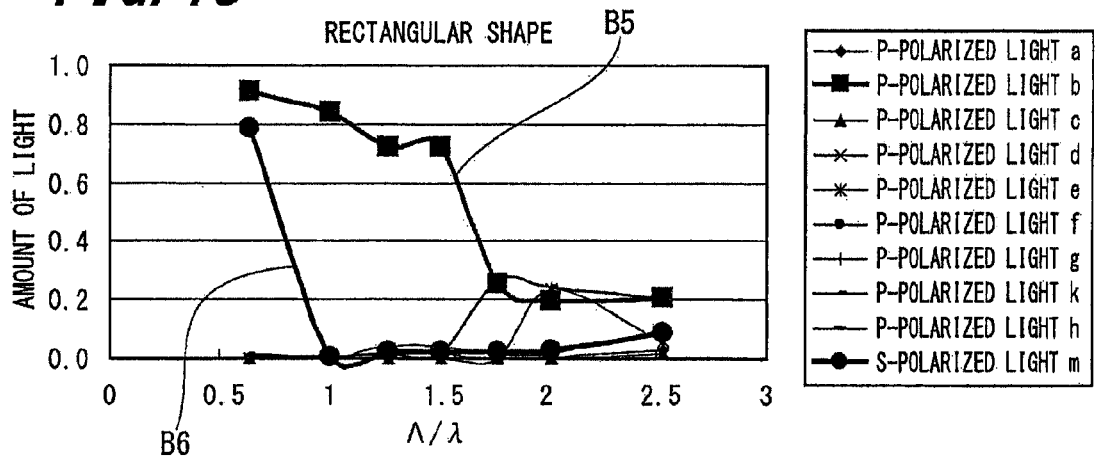
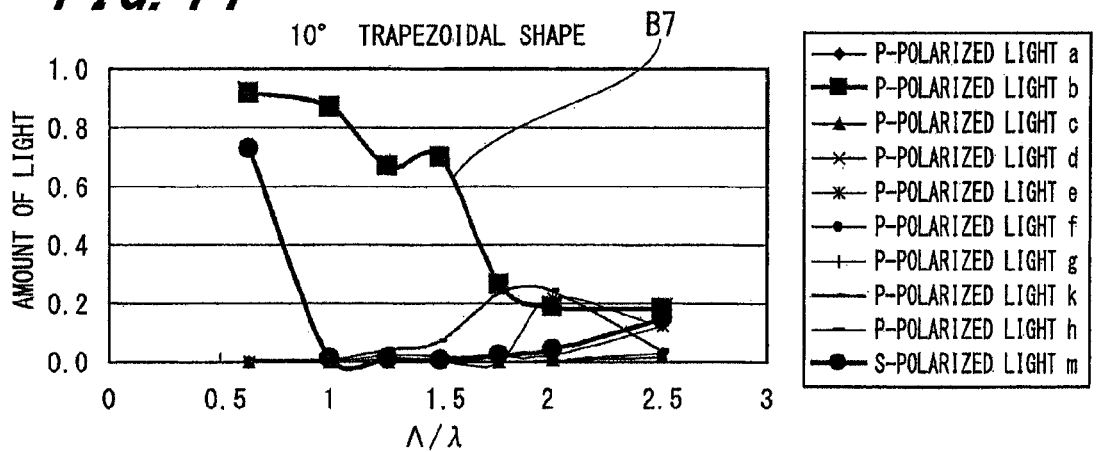
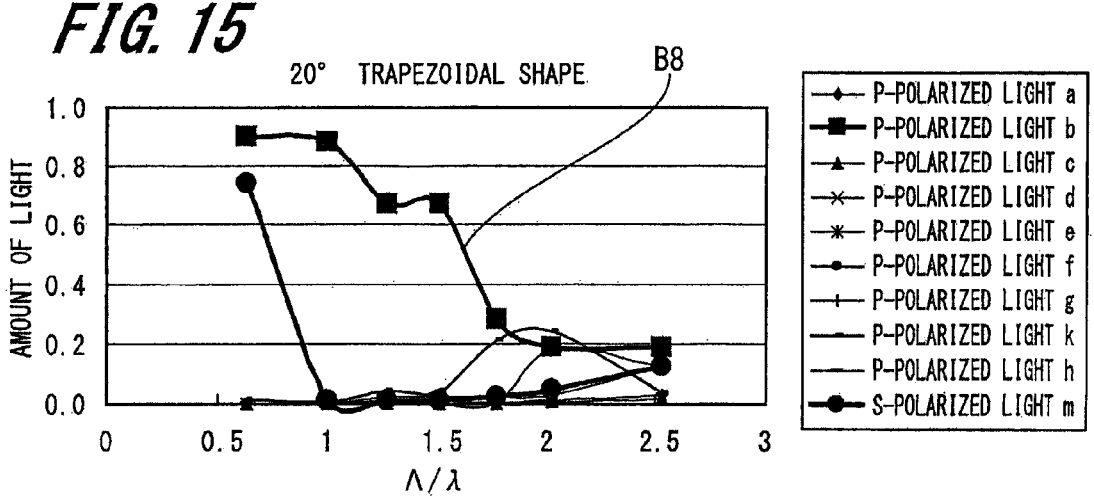

DISPLACEMENT DETECTING DEVICE WITH A POLARIZATION CHANGE TO A TWICE-DIFFRACTED BEAM

CROSS REFERENCES TO RELATED APPLICATIONS

The present invention contains subject matter related to Japanese Patent Application JP 2011-106684 filed in the Japanese Patent Office on May 11, 2011, the entire contents of which being incorporated herein by reference.

BACKGROUND OF THE INVENTION

1. Field of the Invention

The present invention relates to a displacement detecting device adapted to detect displacement of a surface-to-be-measured with high accuracy with a non-contact sensor that uses light.

2. Description of the Related Art

Conventionally, displacement detecting devices are widely used as devices for measuring displacement and shape of a surface-to-be-measured.

Among such displacement detecting devices, there is a type of displacement detecting device adapted to irradiate light on a diffraction grating fixed to a surface-to-be-measured, and detect the phase change of a diffracted light generated accompanying the displacement of the object-to-be-measured.

For example, Japanese Patent Publication No. 4023923 (referred to as "Patent document 1" hereinafter) discloses an art in which a coherent light emitted from a light source is split into two coherent lights, and the two coherent lights are incident on a diffraction grating. Two diffracted lights generated by the two coherent lights incident on the diffraction grating are reflected by a reflection optical system so as to be incident again on the diffraction grating.

By such a method, the light once diffracted is reflected by the reflection optical system and diffracted again by the diffraction grating, and thereby it is possible to improve detection resolution.

Particularly, in the art disclosed in Patent document 1, the coherent light incident on the diffraction grating forms an image on the diffraction grating. Further, the diffracted light is reflected in such a manner that the diffracted light diffracted by the diffraction grating is collimated into a parallel light by an imaging section, so that the light is constantly perpendicularly incident on a reflector.

With such an arrangement, the deviation of the image position of the diffracted light on the grating can be prevented, and the deviation of the optical axis of the diffracted light can also be prevented. Thus, it is possible to perform position detection with high accuracy.

SUMMARY OF THE INVENTION

According to the method disclosed in Patent document 1, when the diffracted light diffracted by the diffraction grating is incident again on the diffraction grating, the polarization direction is rotated by 90 degrees. This is because, by causing the polarization direction of the coherent light firstly incident on the diffraction grating and the polarization direction of the diffracted light obtained after being diffracted twice by the diffraction grating to differ from each other by 90 degrees, the coherent light firstly incident on the diffraction grating and the diffracted light obtained after being diffracted twice by the diffraction grating can be efficiently separated from each other.

On the other hand, in order to improve accuracy of displacement detection, smaller grating period will be required. However, if the grating period becomes smaller, the diffraction efficiency will become dependent on the polarization direction of the incident light.

Thus, with the method disclosed in Patent document 1, even if the diffraction efficiency of the first diffracted light is high, the diffraction efficiency of the second diffracted light will be decreased due to the change of the polarization direction. Thus, the interference signal obtained becomes weak, so that the room for increasing the accuracy of the position detection is limited.

In view of the above problems, it is an object of the present invention to provide a displacement detecting device that exhibits high diffraction efficiency and that can perform position detection with high accuracy, even if the displacement detecting device has a configuration in which the light once diffracted by a diffraction grating is diffracted again by the diffraction grating.

To solve the aforesaid problems, a displacement detecting device according to the present invention includes a diffraction grating having a trapezoidal or rectangular relief shape.

The displacement detecting device according to the present invention further includes an irradiation optical system having a light source section for emitting coherent light and a beam splitter for splitting the light emitted from the light source section into two beams, and adapted to irradiate the two beams onto the diffraction grating as p-polarized light.

The displacement detecting device according to the present invention further includes a reflection optical system and an interference optical system. The reflection optical system reflects the two first diffracted lights back to the diffraction grating as p-polarized light. The interference optical system causes the two second diffracted lights generated by detracting the two first diffracted lights incident again on the diffraction grating are diffracted to interfere with each other so as to obtained interference light.

The displacement detecting device according to the present invention further includes a light receiving section adapted to receive the interference light, and a position information detecting section adapted to detect position information of the diffraction grating based on an interference signal obtained in the interference optical system.

The period of the relief of the diffraction grating is no more than 1.5 times the wavelength of the coherent light incident on the diffraction grating.

In the displacement detecting device according to the present invention, the period of the relief of the diffraction grating is no more than 1.5 times the wavelength of the incident light. Thus, it is possible to achieve high diffraction efficiency with respect to the p-polarized light incident on the diffraction grating.

Further, the light once diffracted by the diffraction grating is incident again on the diffraction grating as a p-polarized light. Thus, high diffraction efficiency can be achieved even when the light is incident again on the diffraction grating.

With the displacement detecting device according to the present invention, since it is possible to achieve high diffraction efficiency with respect to the light incident on the diffraction grating, strong interference signal can be obtained, and therefore position detection can be performed with high accuracy.

BRIEF DESCRIPTION OF THE DRAWINGS

FIG. 13 is a chart showing the relationship between the shape of the relief of the two-dimensional diffraction grating and the intensity of a +1st order diffraction light;

FIG. 14 is another chart showing the relationship between the shape of the relief of the two-dimensional diffraction grating and the intensity of the +1st order diffraction light;

FIG. 15 is further another chart showing the relationship between the shape of the relief of the two-dimensional diffraction grating and the intensity of the +1st order diffraction light;

DETAILED DESCRIPTION OF THE PREFERRED EMBODIMENTS

Preferred embodiments for carrying out the present invention will be described below. However, it should be understood that the present invention is not limited to these embodiments.

Figure 1:
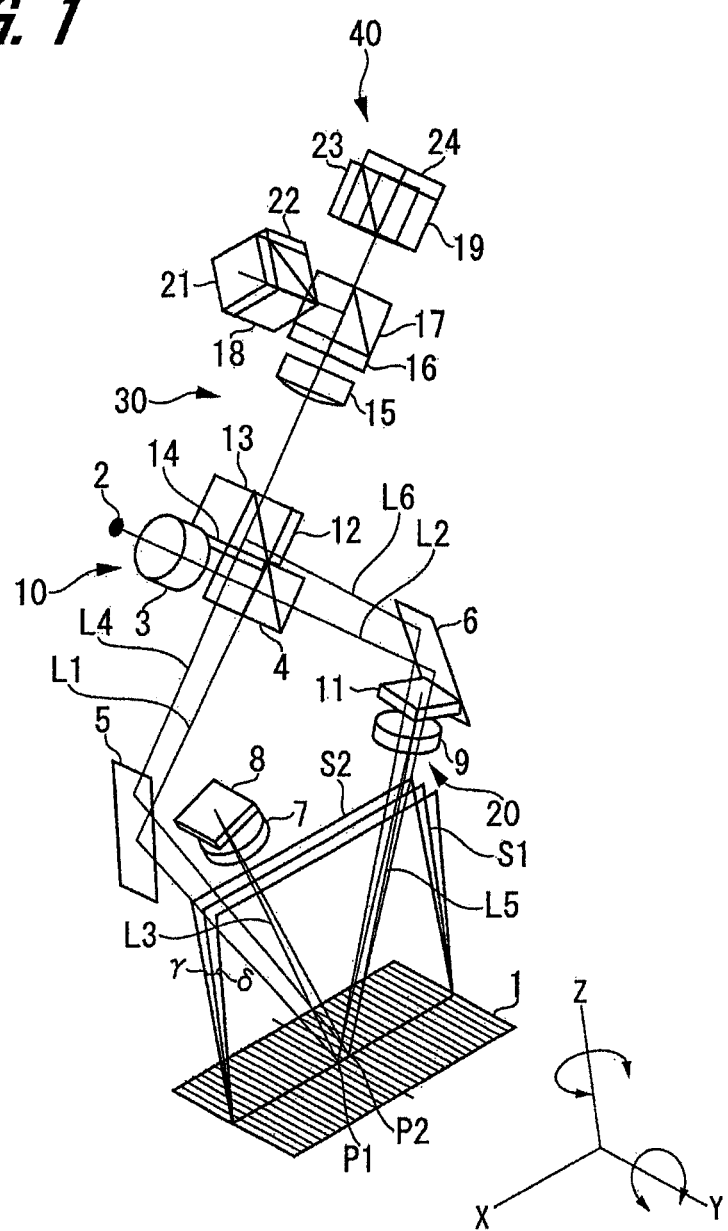
FIG. 1 is a schematic perspective view showing the configuration of a signal acquiring section of a displacement detecting device according to a first embodiment of the present invention.
Figure 2:
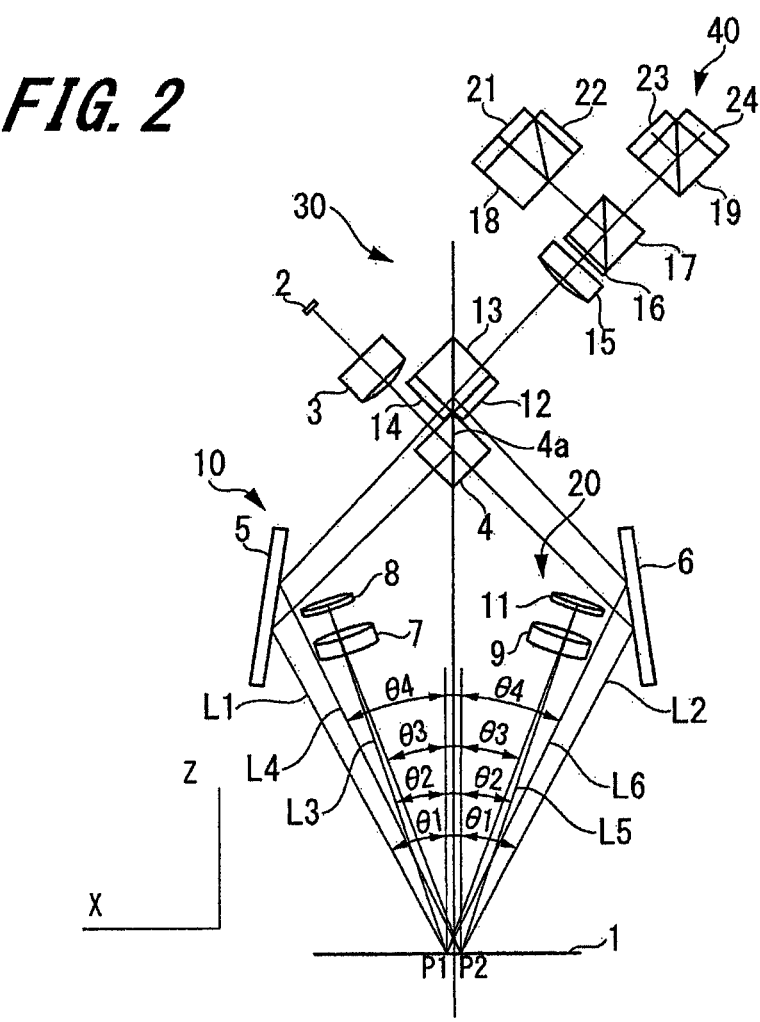
FIG. 2 is a view showing a schematic configuration of the signal acquiring section of the displacement detecting device according to the first embodiment.

The description will be made in the following order.
1. First embodiment
   1-1. Configuration of signal acquiring section
   1-2. Configuration of detection section
   1-3. Configuration of diffraction grating
2. Second embodiment
3. Third embodiment
1. First Embodiment
   1-1. Configuration of Signal Acquiring Section FIG. 1 is a schematic perspective view showing the configuration of a displacement detecting device 100 according to a first embodiment of the present invention. FIG. 2 is a schematic front view of the displacement detecting device 100. In the displacement detecting device 100, a diffraction grating 1 and a signal acquiring section 50 will be first described below with reference to the drawings, wherein the signal acquiring section 50 is adapted to irradiate light on the diffraction grating 1 to generate an interference signal, and receive the interference signal.

Incidentally, the displacement detecting device 100 includes the diffraction grating 1, the signal acquiring section 50, and a position information detecting section 60 (which is to be described later) adapted to detect position information based on the acquired interference signal.

The diffraction grating 1 is a reflective diffraction grating; and as shown in FIG. 1, the periodic structure of the diffraction grating 1 is formed in the X-axis direction. The diffraction grating 1 is fixed to an object-to-be-detected, so that if the object-to-be-detected moves, the diffraction grating 1 will move too.

Further, the signal acquiring section 50 includes an irradiation optical system 10, a reflection optical system 20, an interference optical system 30 and a light receiving section 40.

The irradiation optical system 10 includes a light source section 2 for emitting a coherent light, a beam splitting element 4 arranged in the optical path of the light emitted from the light source section 2, and two mirrors 5, 6 adapted to reflect two beams split by the beam splitting element 4 so that the beams are guided to the diffraction grating 1.

The light source section 2 is configured by, for example, a semiconductor laser diode, a super luminescent diode, a luminescent diode or the like.

The coherent light emitted from the light source section 2 is transmitted through a lens 3 and then incident on the beam splitting element 4. The lens 3 is adapted to cause the coherent light emitted from the light source section 2 to form an image on the diffraction grating 1.

For example, a non-polarizing beam splitter is used as the beam splitting element 4. The coherent light emitted from the light source section 2 is split into a first beam L1 and a second beam L2 by the beam splitting element 4.

The first beam L1 reflected by the beam splitting element 4 is reflected by the mirror 5, and thereby the optical path thereof is changed so that the first beam L1 is incident at a point P1 on the diffraction grating 1. Further, the second beam L2 transmitted through the beam splitting element 4 is reflected by a mirror 6 so as to be incident at a point P2 on the diffraction grating 1.

The points P1, P2 are located along the periodic direction (i.e., the X-axis direction) of the diffraction grating 1.

Here, the first beam L1 and the second beam L2 lie in a plane S2 inclined by an angle γ with respect to a plane S1, which is perpendicular to the surface of the diffraction grating 1 and parallel to the periodic direction (i.e., the X-axis direction) of the diffraction grating 1.

The beams L1, L2 are incident on the diffraction grating as p-polarized light. Particularly, in the present invention, the p-polarized light incident on the diffraction grating 1 is defined as a polarized light whose polarization direction extends along the plane S2 in which the beams L1, L2 lie.

For example, in the case where the a semiconductor laser is used as the light source of the light source section 2, since a linearly polarized light is emitted, the polarization direction of the beams L1, L2 can be adjusted to coincide with the aforesaid polarization direction by rotating the semiconductor laser with the optical axis of the emitted light as a rotation center.

In the case where an unpolarized light source, such as a LED, is used, the polarization direction of the beams L1, L2 can be adjusted by configuring the light source section 2 with the unpolarized light source and a polarizing filter, and rotating the light source section 2.

FIG. 2 is a front view of the displacement detecting device 100 when viewed from the Y-axis direction. As shown in FIG. 2, incident points P1, P2 of the beams L1, L2 are located at positions symmetrical to each other with respect to a beam splitting surface 4a of the beam splitting element 4.

The beam L1 incident at the point P1 is diffracted by the diffraction grating 1, so that a first diffracted light L3 is generated.

In FIG. 2, which is viewed from the Y-axis direction, when the incidence angle of the first beam L1 is θ1 and the diffraction angle of the first diffracted light L3 is θ2, the diffraction angle θ2 can be expressed by the following equation 1.

[Equation 1]

$$\sin\theta 2 = \frac{m\lambda}{\Lambda\cos\phi} - \sin\theta 1 \qquad (1)$$

Wherein {Λ} represents the grating period of the diffraction grating 1; "λ" represents the wavelength of the light; "m" represents the order of the diffraction; and "Φ" represents the angle between the beam L1 incident on the diffraction grating 1 and the plane S1. For example, in the present embodiment, since a 1st-order diffracted light is used as the first diffracted light L3, m=1.

Φ will be described below in more detail with reference to FIG. 3. As described above, the beam L1 lies in the plane S2; and further, the plane S2 is inclined by the angle γ with respect to the plane S1, which is perpendicular to the surface of the diffraction grating 1 and parallel to the periodic direction of the diffraction grating 1.

The incidence angle of a beam L1' obtained by projecting the beam L1 onto the plane S1 is θ1, and the angle between the beam L1 and the beam L1' is Φ.

The first diffracted light L3 is collimated by a lens 7 so as to be substantially perpendicularly incident on a mirror 8.

Figure 4A:
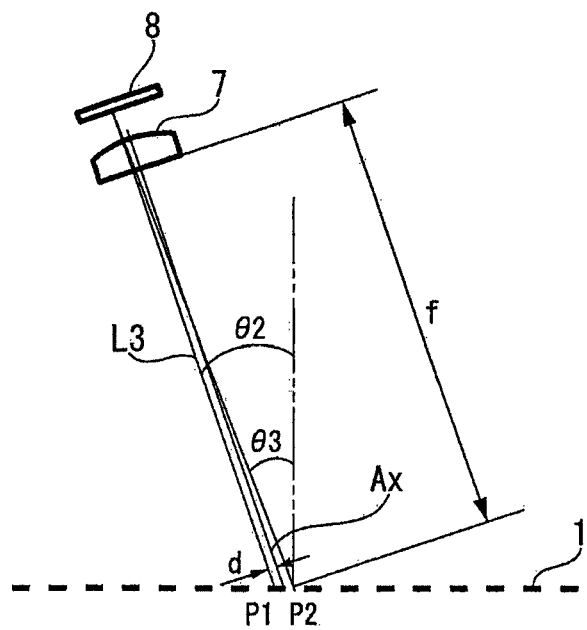
FIG. 4A and FIG. 4B are views each showing an optical path along which a second diffracted light is reflected by a reflection optical system.

As shown in FIG. 4A, the focus of the lens 7 on the side of the diffraction grating 1 is located on the diffraction grating 1. Thus, even if the diffraction grating 1 is rotated in a yawing direction (a direction within the surface of the diffraction grating 1, i.e., a direction within the X-Y plane in FIG. 1) and/or in a pitching direction (a direction within the X-Z plane), the incidence angle at which the first diffracted light L3 reflected by the mirror 8 is incident again on the diffraction grating 1 will not change. Thus, decreasing of the interference signal can be reduced.

However, in the present embodiment, the lens 7 is arranged so that the optical axis Ax of the lens 7 is slightly shifted by a distance d with respect to the first diffracted light L3 generated from the point P1 on the diffraction grating 1.

Thus, as shown in FIG. 4A, the first diffracted light L3 incident on the mirror 8 is reflected by the mirror 8 along an optical path different from the optical path along which the first diffracted light L3 is incident on the mirror 8. Further, the first diffracted light L3 reflected by the mirror 8 is incident at the point P2 on the diffraction grating 1 at an incidence angle θ3, which is different from the diffraction angle θ2 of the first diffracted light L3.

Figure 4B:
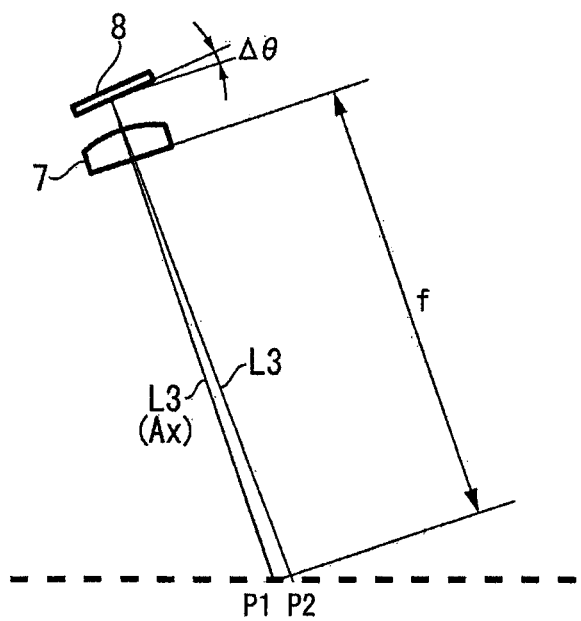

The present invention also includes another possible configuration in which, as shown in FIG. 4B, the lens 7 is arranged so that the optical axis of the first diffracted light L3 incident on lens 7 from the point P1 of the diffraction grating 1 is coincident with the optical axis of the lens 7, and the reflecting surface of the mirror 8 is inclined by Δθ from 90 degrees with respect to the optical axis of the lens 7.

With such a configuration, it is also possible for the first diffracted light L3 reflected by the mirror 8 to be incident at the point P2, which is different from the point P1, on the diffraction grating 1. Incidentally, the focus of the lens 7 is located at the point P1 on the diffraction grating 1.

In such a manner, even if the optical path of the first diffracted light L3 incident on the lens 7 from the diffraction grating 1 is different from the optical path of the first diffracted light L3 reflected by the mirror 8, weakening of the interference signal may also be reduced by locating the focus of the lens 7 on the diffraction grating 1 as described above.

Figure 5:
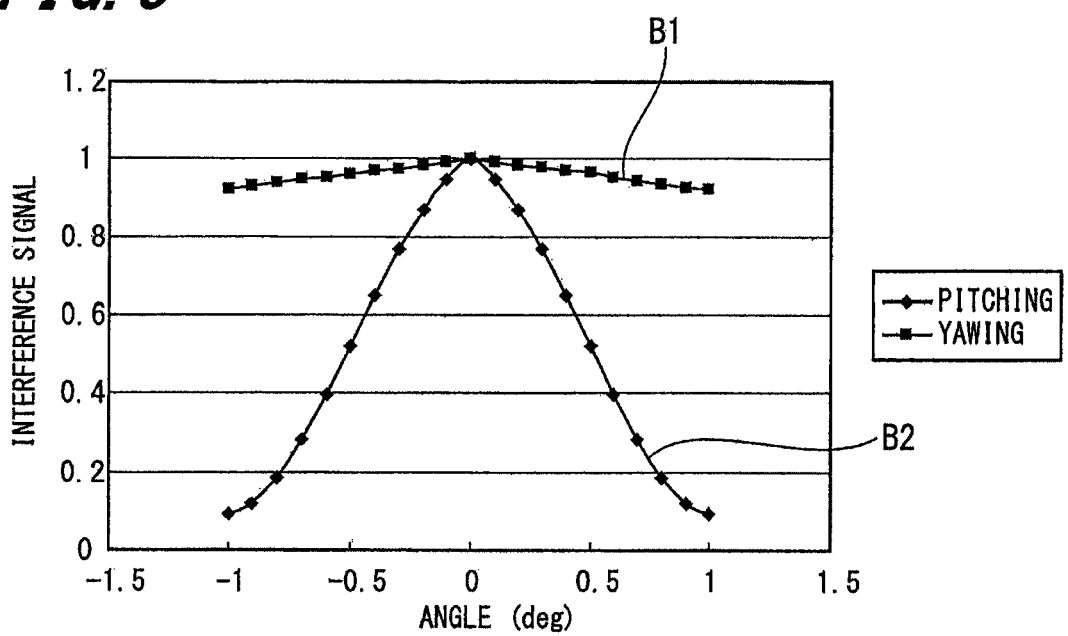
FIG. 5 is a chart for explaining the intensity of an interference signal when the diffraction grating is tilted.

FIG. 5 is a chart obtained by simulating the change of the interference signal when rotating the diffraction grating 1 in the yawing direction and the pitching direction, in the displacement detecting device 100 according to the present embodiment.

In the simulation, the focal length of the lens 7 is 25 nm, and the focus position of the lens 7 is located on the diffraction grating 1. Further, the distance between the point P1 and the point P2 is 1 mm. In the chart shown in FIG. 5, the vertical axis represents the intensity of the interference signal, wherein the intensity of the interference signal when the rotation angle of the diffraction grating 1 is 0 degree is defined as 1; and the horizontal axis represents the rotation angle of the diffraction grating 1.

As shown by curve B1 in FIG. 5, in the case where the diffraction grating 1 is rotated in the yawing direction, the intensity of the interference signal almost does not change.

Further, in the pitching direction shown by curve B2, even if the rotation angle is 0.5 degrees, the intensity of interference signal is maintained at 0.5 or higher.

For example, in the case where the lens 7 is not provided, even if the rotation angle in the pitching direction is 1 arc-minute or smaller, the interference signal will become zero. Thus, it is known that, even if the optical path of the first diffracted light L3 incident on the lens 7 from the diffraction grating 1 is different from the optical path of the first diffracted light L3 reflected by the mirror 8, weakening the interference signal can be sufficiently reduced.

Now, referring back to FIGS. 1 and 2, the first diffracted light L3 incident at the point P2 on the diffraction grating 1 at the incidence angle θ3 is diffracted by the diffraction grating 1, so that a second diffracted light L4 having a diffraction angle θ4 is generated. In the present invention, the second diffracted light L4 is a 1st-order diffracted light.

The second diffracted light L4 is incident again on the mirror 5. However, in the present embodiment, as shown by the point P1 and the point P2 in FIG. 2, the position at which the first beam L1 is incident on the diffraction grating 1 is different from the position at which the second diffracted light L4 is generated on the diffraction grating 1. Thus, it is possible to respectively set the optical path of the first beam L1 and the optical path of the second diffracted light L4, so that it is possible to easily separate the first beam L1 and the second diffracted light L4 from each other.

Further, by setting the incidence angle θ1 at which the first beam L1 is incident on the diffraction grating 1 and the diffraction angle θ4 of the second diffracted light L4 to different values from each other, it is possible to more largely separate the optical path of the first beam L1 and the optical path of the second diffracted light L4 from each other.

For example, the incidence angle θ1 of the first beam L1 and the diffraction angle θ4 of the second diffracted light L4 can be changed by adjusting the angle of the mirror 5, the shift amount of the optical axis of the lens 7, and/or the like.

However, it is preferred that the incidence angle θ1 and the diffraction angle θ4 are set as small as possible within a ranged in which the first beam L1 and the second diffracted light L4 are sufficiently possible to be separated from each other.

On the other hand, the second beam L2 transmitted through the beam splitting element 4 is reflected by the mirror 6 so as to be incident at the point P2 on the diffraction grating 1 at the incidence angle θ1. As shown in FIG. 2, the mirror 6, a lens 9 and a mirror 11 are respectively symmetrical to the mirror 5, the lens 7 and the mirror 8 with respect to the beam splitting surface 4a of the beam splitting element 4.

Thus, the second beam L2 incident at the point P2 on the diffraction grating 1 passes through an optical path symmetrical to the optical path of the first beam L1 incident at the point P1 on the diffraction grating 1.

For example, the second beam L2 incident at the point P2 on the diffraction grating 1 is diffracted by the diffraction grating 1, so that a first diffracted light L5 having a diffraction angle θ2 is generated. The first diffracted light L5 is transmitted through the lens 9 and then reflected by the mirror 11 so as to be incident again on the lens 9. The first diffracted light L5 transmitted through the lens 9 is incident on the diffraction grating 1 at the point P1 where a second diffracted light L6 having a diffraction angle θ4 is generated.

Further, the second diffracted light L6 is incident again on the mirror 6.

The optical path of the first beam L1 in the segment from being incident at the point P1 until being incident again on the mirror 5 as the second diffracted light L4 and the optical path of the second beam L6 in the segment from being incident at the point P2 until being incident again on the mirror 6 as the second diffracted light L6 both pass through the point P1 and the point P2 on the diffraction grating 1.

Thus, even if there is a local shape error in the diffraction grating 1, since the second diffracted lights L4, L6 are affected equally, the local shape error can be inhibited from becoming a source of error.

The second diffracted lights L4, L6 respectively reflected by the mirror 5 and the mirror 6 are incident on the interference optical system 30.

The interference optical system 30 includes a half-wave plate 12 arranged in the optical path of the second diffracted light L6, a light combiner 13 for combining the two second diffracted lights L4, L6, and a quarter-wave plate 16 arranged in the optical path of the light combined by the light combiner 13.

The interference optical system 30 further includes a non-polarizing beam splitter 17 adapted to split the beam transmitted through the quarter-wave plate 16, and two polarizing beam splitters 18, 19 respectively arranged in the optical paths of the beams split by the non-polarizing beam splitter 17.

The second diffracted light L6 is transmitted through the half-wave plate 12 and thereby the polarization direction thereof is rotated by 90 degrees, and is incident on the light combiner 13 as an s-polarized light. Further, the second diffracted light L4 is transmitted through a dummy glass 14 and then incident on the light combiner 13 as a p-polarized light.

The dummy glass 14 has the same optical path length as that of the half-wave plate 12. Thus, the second diffracted light L6 transmitted through the half-wave plate 12 has the same optical path length as that of the second diffracted light L4 transmitted through the dummy glass 14.

The second diffracted light L4 is transmitted through the light combiner 13, which is a polarizing beam splitter or the like, as p-polarized light; and the second diffracted light L6, which is s-polarized light, is reflected by the light combiner 13. Thus, the second diffracted light L4 and the second diffracted light L6 are combined in the same optical path.

In the present embodiment, since two beams, which are p-polarized lights, are incident on the diffraction grating 1, a non-polarizing beam splitter is provided as the beam splitting element 4.

As is described above, since the second diffracted lights L4, L6 are reflected by the mirrors 5, 6 along optical paths different from the optical paths of the beams L1, L2, the light combiner 13 and the beam splitting element 4 can be arranged without obstructing each other.

The combined second diffracted lights L4, L6 are transmitted through a lens 15 so as to be incident on the quarter-wave plate 16. Incidentally, the lens 15 is adapted to cause the second diffracted lights L4, L6 to be condensed on four light receiving elements 21, 22, 23, 24.

The quarter-wave plate 16 is arranged so that the optic axis thereof is inclined by 45 degrees with respect to the polarization direction of the second diffracted lights L4, L6. Thus, when the second diffracted lights L4, L6 are transmitted through the quarter-wave plate 16, they become two circularly polarized lights with mutually reversed rotational directions.

Further, since the second diffracted lights L4, L6 are located in the same optical path, they superimpose on each other to thereby become a linearly polarized light whose polarization direction rotates according to the change of the phase difference between the second diffracted lights L4, L6 (i.e., the phase change caused by the displacement of the diffraction grating 1).

The linearly polarized light is split into two beams by the non-polarizing beam splitter 17 such as a half mirror or the like.

The beam reflected by the non-polarizing beam splitter 17 is incident on the polarizing beam splitter 18 where the beam is split into an s-polarized light component and a p-polarized light component.

Similarly, the beam transmitted through the non-polarizing beam splitter 17 is incident on the polarizing beam splitter 19 where the beam is split into an s-polarized light component and a p-polarized light component.

The s-polarized light component and the p-polarized light component are received by the light receiving section 40. The light receiving section 40 includes the light receiving elements 21, 22 for respectively receiving the beams split by the polarizing beam splitter 18, and the light receiving elements 23, 24 for respectively receiving the beams split by the polarizing beam splitter 19. For example, a photodiode or the like may be used as each of the light receiving elements 21 to 24.

The p-polarized light component transmitted through the polarizing beam splitter 18 is received by the light receiving element 21, and the s-polarized light component reflected by the polarizing beam splitter 18 is received by the light receiving element 22.

When two components whose polarization directions are different from each other by α degrees are extracted by a polarizer, such as a polarizing beam splitter or the like, from the linearly polarized light, the phases of the signals detected based on the intensity of the extracted lights will be different from each other by 2α degrees.

Here, two polarized light components whose polarization directions are different from each other by 90 degrees are extracted by the polarizing beam splitter 18, and the phases of the intensity signals of the lights detected by the light receiving elements 21, 22 are different from each other by 180 degrees.

Thus, it is possible to remove the DC component of the signal by calculating the difference between the intensity signal of the light obtained by the light receiving element 21 and the intensity signal of the light obtained by the light receiving element 22.

On the other hand, among the beams incident on the polarizing beam splitter 19, the s-polarized light component reflected by the polarizing beam splitter 19 is received by the light receiving element 23; while the p-polarized light component transmitted through the polarizing beam splitter 19 is received by the light receiving element 24.

Here, the phases of the intensity signals of the lights detected by the light receiving elements 23, 24 are also different from each other by 180 degrees.

Further, the polarizing beam splitter 19 is obliquely disposed so that a polarized light component having a polarization direction different from the polarization direction of the polarized light component extracted by the polarizing beam splitter 18 by 45 degrees is extracted.

Thus, when the s-polarized light reflected by the polarizing beam splitter 19 is received by the light receiving element 23, the intensity signal of the light will be a signal whose phase is 90 degrees different from that of the signal obtained by the light receiving element 21.

Further, when the p-polarized light transmitted through the polarizing beam splitter 19 is received by the light receiving element 24, the intensity signal of the light will be a signal whose phase is 90 degrees different from that of the signal obtained by the light receiving element 22.

Thus, a Lissajous signal can be obtained by, for example, using the signals obtained by the light receiving elements 21, 22 as sine signals, and using the signals obtained by the light receiving elements 23, 24 as cosine signals.

Incidentally, the interference signal obtained by the light receiving elements 21 to 24 is a current signal expressed by the following equation 2.

[Equation 2]

$$I = I_1 + I_2 + 2\sqrt{I_1 I_2} \cos(4Kx + \delta) \quad (2)$$

Wherein "$I_1$" and "$I_2$" represent the intensities of the second diffracted light L4, L6 respectively obtained by the light receiving elements 21 to 24, "K" represents the wave number of the diffraction grating 1, and "δ" represents the initial phase. If the grating period of the diffraction grating 1 is Λ, the wave number K can be expressed as: K=2π/Λ. Further, "x" represents the displacement of the diffraction grating 1.

Thus, if the diffraction grating 1 is displaced by Λ/4 in the X-axis direction, the interference signal will change by one cycle.

Further, in the case where a light source whose coherence length is within a predetermined range is used as the light source section 2, it is preferred that the optical path length of the first beam L1 in the segment until being incident on the light combiner 13 as the second diffracted light L4 is equal to the optical path length of the second beam L2 in the segment until being incident on the light combiner 13 as the second diffracted light L6.

Thus, the error caused by the fluctuation of the wavelength can be reduced. Examples of such light source include, for example, a multimode semiconductor laser diode, a super luminescent diode and the like.

By using such light source, it is possible to easily detect optical path length difference as the change of the visibility of the interference fringes. Further, the optical path length can be adjusted by adjusting the positions of the mirrors 5, 6 or the positions of the mirrors 8, 11.

1-2. Configuration of Detection Section

Figure 6:
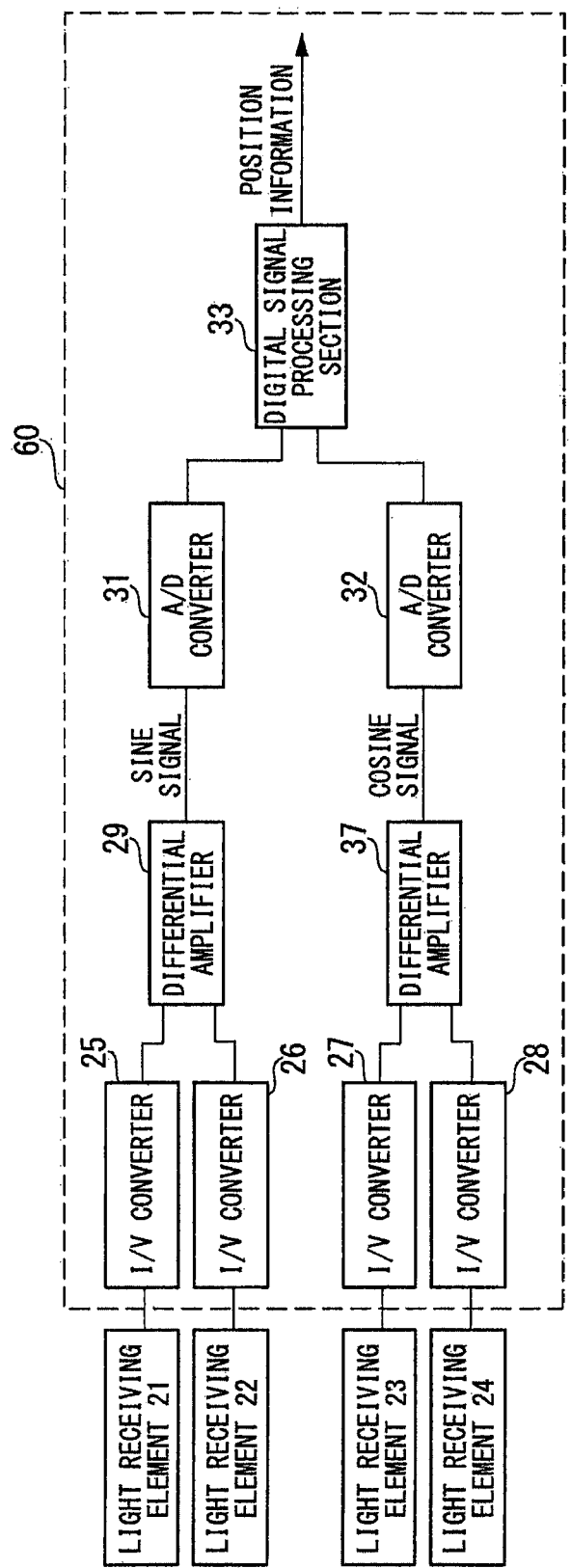
FIG. 6 is a block diagram showing the configuration of a position information detecting section.

The signal obtained by the light receiving elements 21 to 24 is calculated by the position information detecting section shown in FIG. 6, and the amount of displacement of the surface-to-be-measured is counted.

The current signals obtained by the light receiving elements 21, 22 are converted into voltage signals by two I/V converter 25, 26. The voltage signals converted by the I/V converters 25, 26 are differential-amplified by a differential amplifier 29, so that the DC component of the interference signal is cancelled.

Further, such signal is A/D-converted by an A/D converter 31, and the converted signal is inputted to a digital signal processing section 33. In the digital signal processing section 33, the signal amplitude, offset and phase of the inputted signal are corrected, and the signal is outputted as an A-phase incremental signal, for example.

Similarly, the current signals obtained by the light receiving elements 23, 24 are converted into voltage signals by two I/V converters 27, 28. Further, the voltage signals are differential-amplified by a differential amplifier 37, and then A/D-converted by an A/D converter 32.

The signal amplitude, offset and phase of the A/D-converted signal are corrected by the digital signal processing section 33, and the signal is outputted as a B-phase incremental signal whose phase is different from that of the A-phased incremental signal by 90 degrees.

Whether the two phases of the incremental signals obtained in the aforesaid manner are positive or negative is discriminated by a pulse discrimination circuit or the like (not shown in the drawings), and thereby it is possible to detect whether the amount of displacement of the surface-to-be-measured in the X-axis direction (see FIG. 1) is in positive direction or negative direction.

Further, it is possible to perform measurement to see how many the aforesaid cycles of the intensity of the interference light of the second diffracted light L4 and the second diffracted light L6 have changed by counting the number of phase change of the incremental signal per unit time with a counter (not shown in the drawings). Thus, it is possible to detect the amount of displacement of the surface-to-be-measured in the X-axis direction.

Incidentally, the position information outputted by the position information detecting section 60 of the present embodiment may either be the aforesaid two phases of incremental signals, or be a signal including the amount and direction of the displacement calculated based on the two phases of incremental signals.

Further, the aforesaid pulse discrimination circuit and counter may also be built into the digital signal processing section 33.

Figure 7:
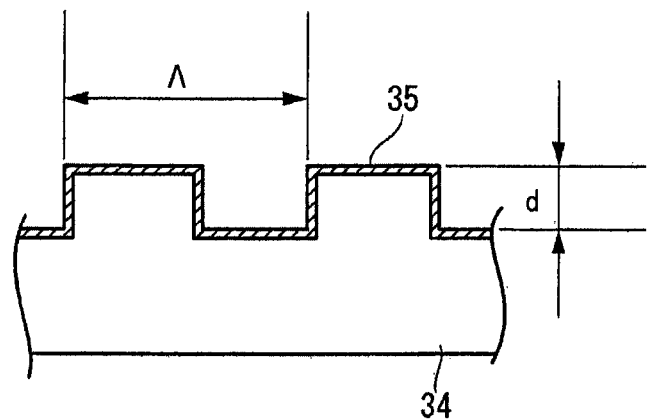
FIG. 7 is a schematic cross section of the diffraction grating.

1-3. Configuration of Diffraction Grating (1) One-dimensional Diffraction Grating When performing one-dimensional position detection, a diffraction grating 1 having rectangular relief arranged in a one-dimensional direction (i.e., the X-axis direction), as shown in FIG. 7, can be used. If the grating period of the diffraction grating 1 is Λ, the grating period Λ will be no more than 1.5 times the wavelength λ of the light incident on the diffraction grating 1.

Incidentally, Λ represents the wavelength of the light when the light is incident on the diffraction grating 1; and, if the wavelength of the light in vacuum is $\lambda_0$ and the refractive index of the atmosphere surrounding the diffraction grating 1 is n, then the following equation is derived: $\lambda = \lambda_0/n$.

Figure 8:
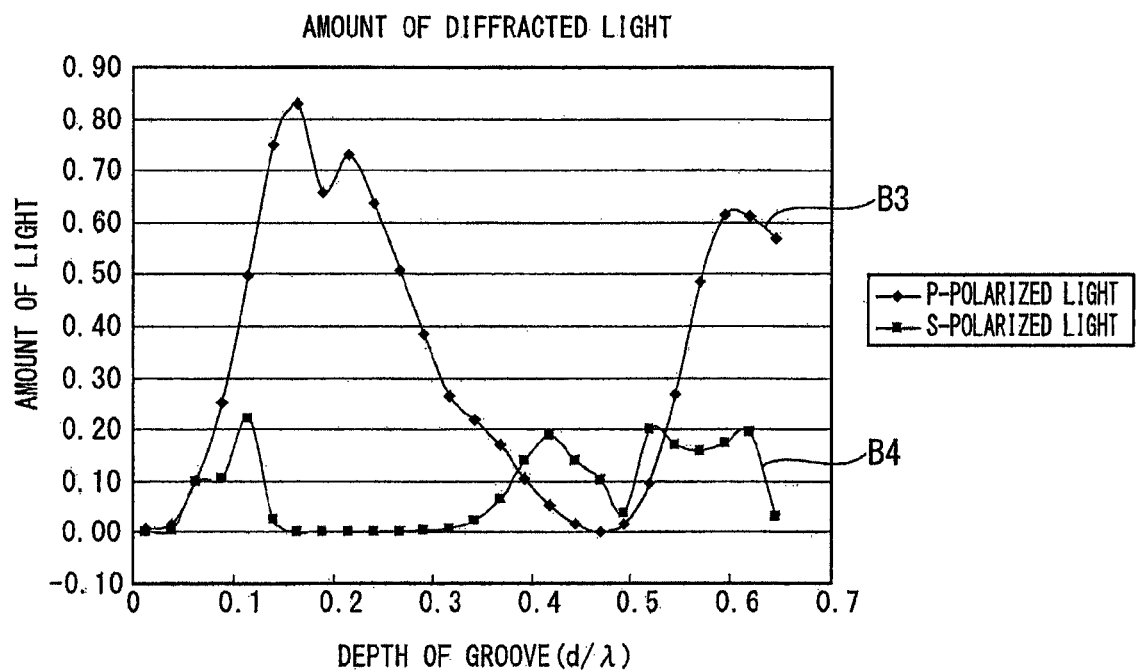
FIG. 8 is a chart showing the relationship between the shape of the relief of the diffraction grating and the intensity of the diffracted light.

For example, FIG. 8 shows amount of light of the 1st-order diffracted light obtained by simulation in a case where a light having a wavelength of 0.79 μm was incident on the diffraction grating 1 at θ1=20°, where γ=0° (see FIG. 3), and Λ/λ=1.

In the simulation, RCWA (Rigorous Coupled Wave Theory) method was used. RCWA method is a method capable of accurately simulating the diffracted light even in the case where the grating structure is equal to or smaller than the wavelength of the light.

Incidentally, the amount of the light represented by the vertical axis is expressed as numerical value base on an assumption that the amount of the light incident on the diffraction grating 1 is 1. Further, the horizontal axis represents the ratio of the depth d of the groove of the diffraction grating 1 to the wavelength λ. Further, a diffraction grating created by forming a gold thin film 35 on a glass substrate 34 having rectangular relief formed therein is used as the diffraction grating 1.

The curve B3 (which represents a case where a p-polarized light whose polarization direction extends along the periodic direction of the diffraction grating 1 is incident on the diffraction grating 1) shows that an amount of light up to more than 0.8 at maximum can be obtained.

In contrast, the curve B4 (which represents a case where an s-polarized light is incident on the diffraction grating 1) shows that, when d/λ falls in a range of 0.2 to 0.3, the amount of light is almost zero.

Thus, in the cases where the polarization direction of the first incidence and the polarization direction of the second incidence with respect to the diffraction grating are different from each other by 90 degrees, such as the case described in Patent document 1, even if the first incidence is performed by a p-polarized light, for example, since the second incidence is performed by an s-polarized light, the amount of the diffracted light in the second incidence is very small.

Thus, it is not possible to take advantage of the high diffraction efficiency achieved by the p-polarized light.

Further, such trend of both the p-polarized light and the s-polarized light with respect to the diffraction grating 1 will become more pronounced as the Λ/λ becomes 1.5 or lower.

On the other hand, in the displacement detecting device according to the present embodiment, p-polarized light is incident on the diffraction grating 1 in both the first incidence and the second incidence. Thus, high diffraction efficiency can be achieved in both the first diffraction and the second diffraction, and therefore the light receiving elements 21 to 24 can receive the interference light of stronger intensity. In other words, it is possible to obtain a detection signal with a high S/N ratio.

The S/N ratio of the detection signal is an important condition necessary for dividing one cycle of the signal into several thousand fractions to obtain a high resolution.

(2) Two-Dimensional Diffraction Grating

Figure 9:
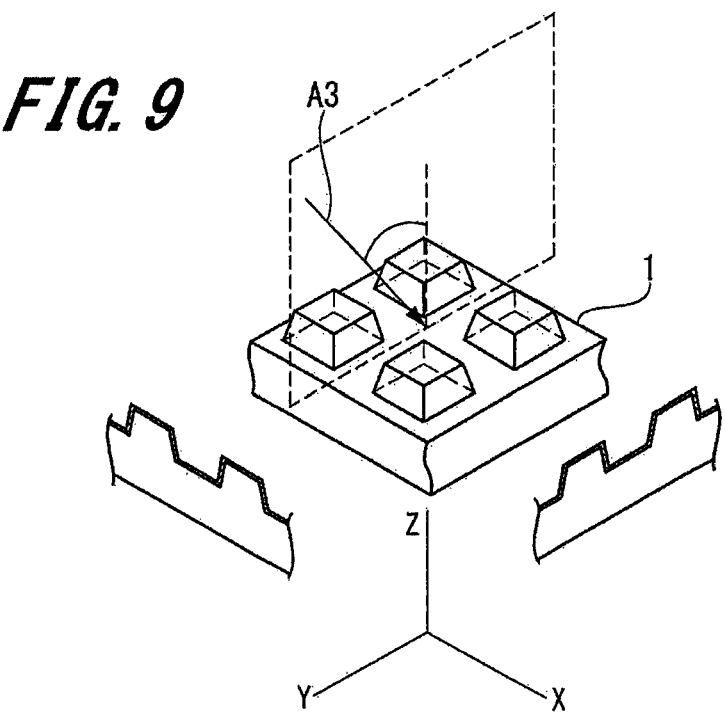
FIG. 9 is a view showing the light incident on the diffraction grating.

When performing two-dimensional displacement detection, a diffraction grating 1 having a periodic structure of relief arranged in a two-dimensional direction, as shown in FIG. 9, can be used. In such diffraction grating 1, relief having a rectangular or trapezoidal cross-section when viewed from the X-axis direction and the Y-axis direction is periodically formed.

Figure 10:
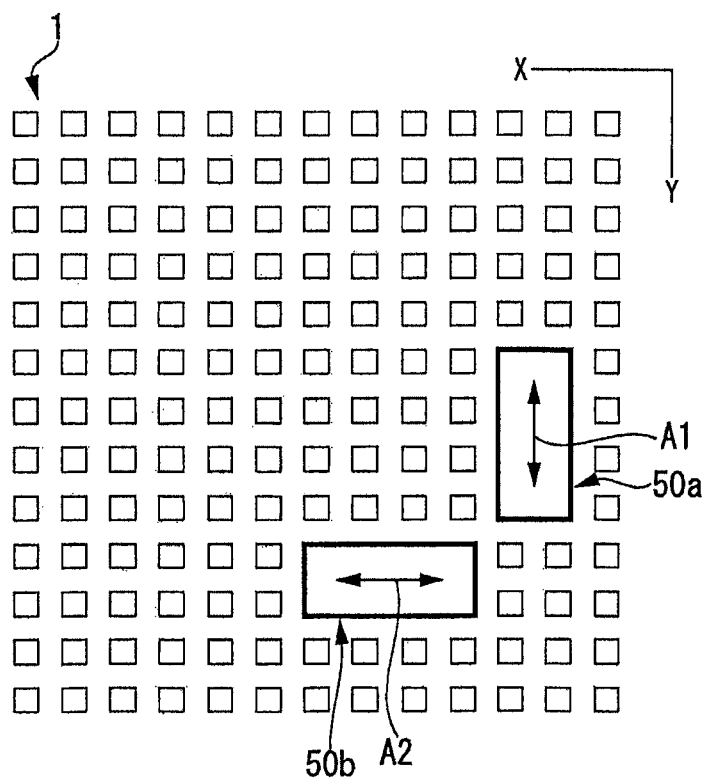
FIG. 10 is a view for explaining a state where two signal acquiring sections are arranged with respect to a two-dimensional diffraction grating.

FIG. 10 is a top view of the diffraction grating 1 when viewed from the Z-axis direction. Two signal acquiring sections 50a and 50b are arranged corresponding to the X-axis direction and the Y-axis direction respectively, and thereby the displacement in both the X-axis direction and the Y-axis direction can be detected.

The signal acquiring sections 50a, 50b are identical to the signal acquiring section 50 shown in FIG. 1. However, on the diffraction grating 1, the two points at which the light is incident from the signal acquiring section 50a are arranged along the Y-axis direction, while the two points on which the light is incident from the signal acquiring section 50b are arranged along the X-axis direction.

With such an arrangement, the signal acquiring section 50a acquires the interference signal caused by the displacement in the Y-axis direction indicated by arrow A1, and the signal acquiring section 50b acquires the interference signal caused by the displacement in the X-axis direction indicated by arrow A2.

The position information in both the X-axis direction and the Y-axis direction can be detected by connecting the position information detecting section 60 shown in FIG. 6 to the signal acquiring sections 50a, 50b respectively.

When light is incident on the two-dimensional diffraction grating 1, the diffracted light will be generated in a two-dimensional direction. For example, when light is incident on the diffraction grating 1 in the X-axis direction as shown by arrow A3 in FIG. 9, diffracted lights possible to be generated are shown in FIG. 11.

Figure 11:
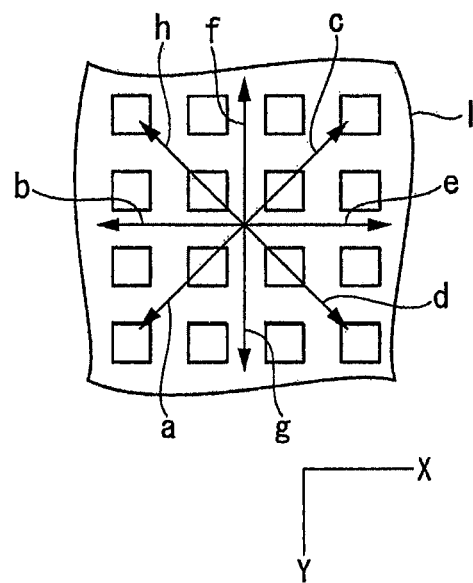
FIG. 11 is a view showing the diffracted light generated by the two-dimensional diffraction grating.

As shown by arrows "a" to "h" in FIG. 11, the diffracted lights may be generated in eight directions within the surface of the diffraction grating 1. Here, the 1st-order diffracted light equivalent to the first diffracted light L3 in FIG. 2 is the diffracted light indicated by arrow "b". Thus, when performing displacement detection, the other diffracted lights than the diffracted light indicated by "b" arrow are unnecessary; and if the diffracted lights indicated by arrows "a" and "c" to "h" are received by the signal acquiring sections 50a, 50b, it will not be possible to acquire accurate interference signal.

Thus, it is preferred to increase the intensity of the diffracted light indicated by arrow and reduce the intensity of the diffracted lights indicated by arrows "a" and "c" to "h" as much as possible.

Figure 12:
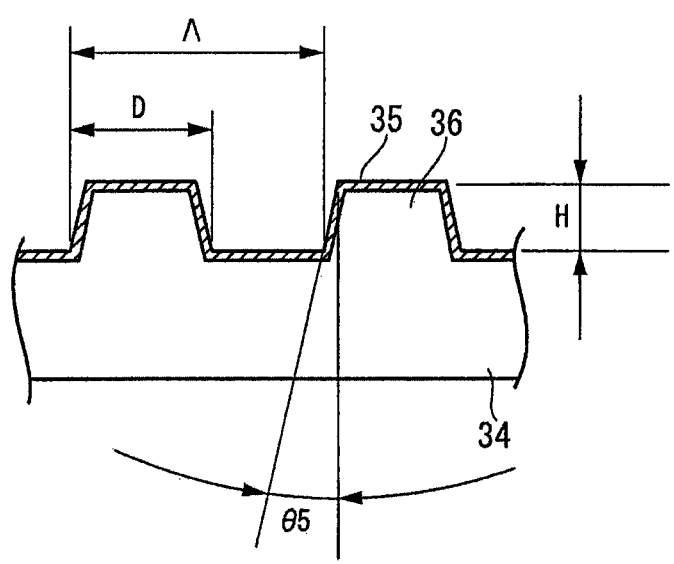
FIG. 12 is a schematic cross section of the two-dimensional diffraction grating.
Figure 16:
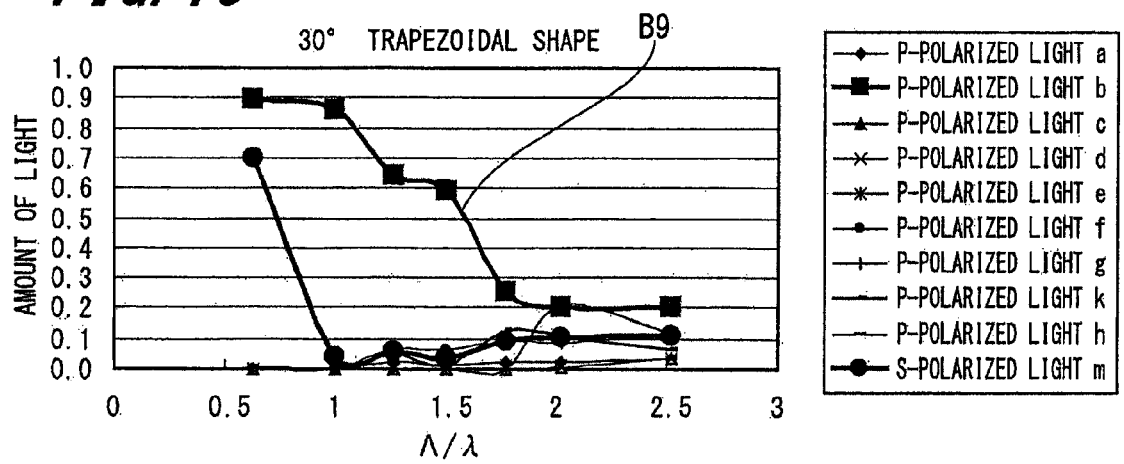
FIG. 16 is further another chart showing the relationship between the shape of the relief of the two-dimensional diffraction grating and the intensity of the +1st order diffraction light.
Figure 17:
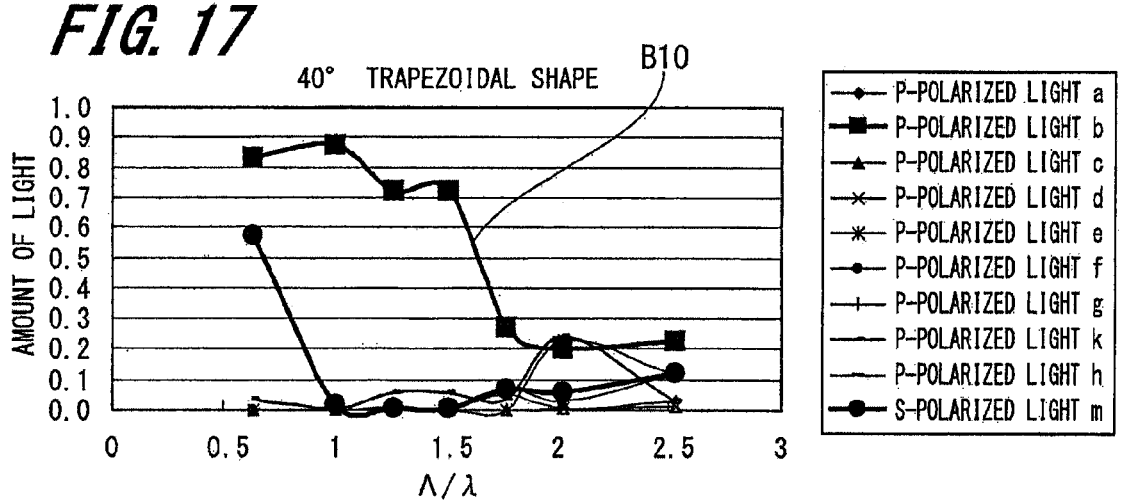
FIG. 17 is further another chart showing the relationship between the shape of the relief of the two-dimensional diffraction grating and the intensity of the +1st order diffraction light.
Figure 18:
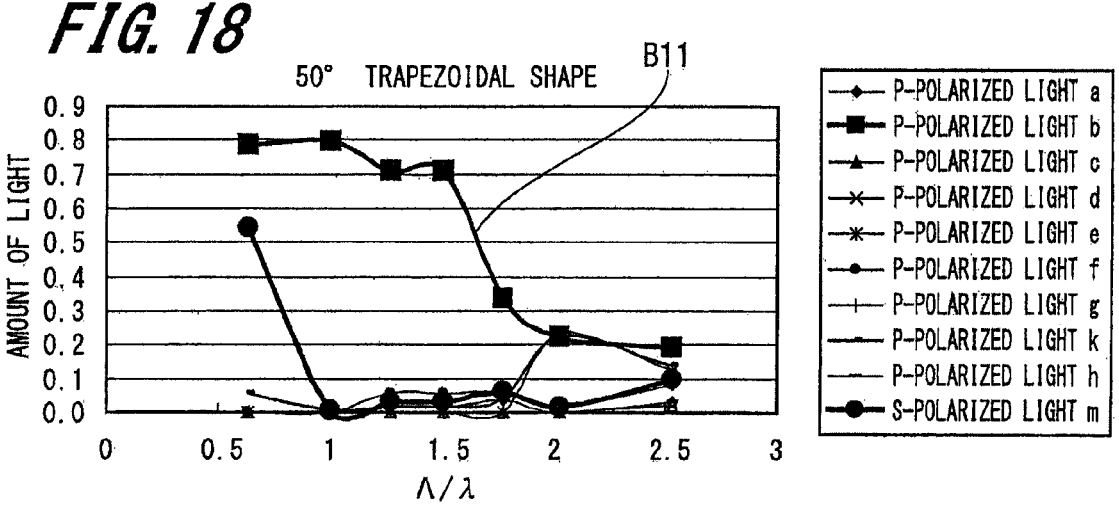
FIG. 18 is further another chart showing the relationship between the shape of the relief of the two-dimensional diffraction grating and the intensity of the +1st order diffraction light.

Therefore, the intensity of the diffracted lights generated in the aforesaid directions was simulated in the case where an angle θ5 between the side face of each of projections 36, which form the relief of the diffraction grating 1, and the normal line to the grating plane of the diffraction grating 1 when viewed from the X-axis direction or the Y-axis direction, as shown in FIG. 12, was changed.

In the simulation, the aforesaid RCWA method was used, and a diffraction grating 1 which includes a glass substrate 34 and a gold thin film 35 (as a reflective film) formed on the substrate 34 was used.

In FIG. 12, "Λ" represents the period of the relief of the diffraction grating 1, "D" represents the width of the projection 36, and "H" represents the height of the projection 36.

Incidentally, the projection 36 has a so-called "truncated regular quadrangular pyramid" shape, which appears the same shape when viewed either from the X-axis direction or from the Y-axis direction. When angle θ5 is 0 degree, the projection 36 becomes a rectangular parallelepiped shape, which looks like a rectangle when viewed either from the X-axis direction or from the Y-axis direction.

FIGS. 13 to 18 each show the intensity of the diffracted lights when a p-polarized light was incident on the diffraction grating 1, wherein the angle θ5 were respectively 0 degree, 10 degrees, 20 degrees, 30 degrees, 40 degrees and 50 degrees. In FIGS. 13 to 18, the horizontal axis represents Λ/λ, and the vertical axis represents the intensity of the diffracted lights, which is expressed as numerical value base on an assumption that the intensity of the incident light is 1.

In the simulation, the intensity of each diffracted light was obtained under a condition that the intensity of the 1st-order diffracted light became the maximum. The condition of H, incidence angle and D under which the intensity of the 1st-order diffracted light becomes the maximum will change depending on the value of the period Λ/λ of the diffraction grating 1. However, the 1st-order diffracted light becomes the maximum when D is set in a range so that D/Λ=0.7 to 0.9, H is set in a range of 0.1λ to 0.3λ, and the incidence angle is set to a value so that value of the diffraction angle and the value of the incidence angle of the 1st-order diffracted light are close to each other (θ2≅θ1).

In FIGS. 13 to 18, the symbols plotted corresponding to the directions indicated by arrows "a" to "h" as shown in FIG. 11 are denoted by codes "a" to "h". Further, symbol "k" represents the light reflected from the diffraction grating 1.

Further, symbol "m" represents the intensity of the diffracted light generated in the direction indicated by arrow "b" (see FIG. 11) in the case where an s-polarized light is incident on the diffraction grating 1.

It can be known from FIG. 13, which shows a case where angle θ5 is set to 0 degree, that when the value of Λ/λ is 1.5 or smaller, the intensity of the 1st-order diffracted light indicated by curve B5 (symbol "b") is 0.6, which is high diffraction efficiency. On the other hand, the intensity of the diffracted lights in other directions is lower than 1/10 of the intensity of the 1st-order diffracted light indicated by curve B5.

Further, when the value of Λ/λ exceeds 1.5, the intensity of the diffracted light indicated by curve B5 will rapidly decrease, but instead the intensity of other diffracted lights will increase.

Further, when the value of Λ/λ is in a range of 1<Λ/λ<1.5, the intensity of the diffracted light of the s-polarized light indicated by curve B6 (symbol "m") will become very small. From the above results, it can be known that the present embodiment, in which a p-polarized light is incident, is very effective for obtaining high intensity of the diffracted light in both the first incidence and the second incidence with respect to the diffraction grating 1.

Incidentally, when Λ/λ=0.6, the intensity of the diffracted light of the s-polarized light indicated by curve B6 (symbol "m") becomes 0.8, which is high level. Thus, at this time, it is also possible to use s-polarized light as the incident light to be incident on the diffraction grating 1. However, even so, the intensity of the diffracted light of the s-polarized light is smaller than the intensity of the diffracted light of the p-polarized light indicated by curve B5 by more than 10%.

Further, it can also be known from FIGS. 14 to 18 (which show the cases where the angle θ5 of the projection 36 were respectively 10 degrees, 20 degrees, 30 degrees, 40 degrees and 50 degrees) that when Λ/λ is 1.5 or smaller, the intensity of the 1st-order diffracted light of the p-polarized light incident on the diffraction grating 1 is 0.6 or larger, as indicated by curves B7 to B11, which is high level.

On the other hand, when Λ/λ is 1.5 or smaller, other diffracted lights of the p-polarized light were almost not generated.

Further, when Λ/λ become larger than 1.5, the intensity of the 1st-order diffracted light of the p-polarized light indicated by curves B7 to B11 will rapidly decrease.

Incidentally, in the case where the angle θ5 is 50 degrees, the projection 36 almost has a shape of a quadrangular pyramid under a condition that H is an optimal value.

It can be known from the above description that, in the case where the projection 36 of the diffraction grating 1 has a rectangle shape or a truncated regular quadrangular pyramid shape, when the value of Λ/λ is 1.5 or smaller, unnecessary diffracted light of the p-polarized light will not be generated regardless of the value of θ5.

Further, when the value of Λ/λ is 1.5 or smaller, the diffraction efficiency of the 1st-order diffracted light of the p-polarized light is higher than that of the diffracted light of the s-polarized light regardless of the value of θ5.

Thus, in the present embodiment, it is preferred that a diffraction grating whose Λ/λ is 1.5 or smaller is employed, even in the case where a two-dimensional diffraction grating is used. With such a configuration, it is possible to obtain the interference signal of high intensity, and it is possible to improve the accuracy of the displacement detection.

Figure 3:
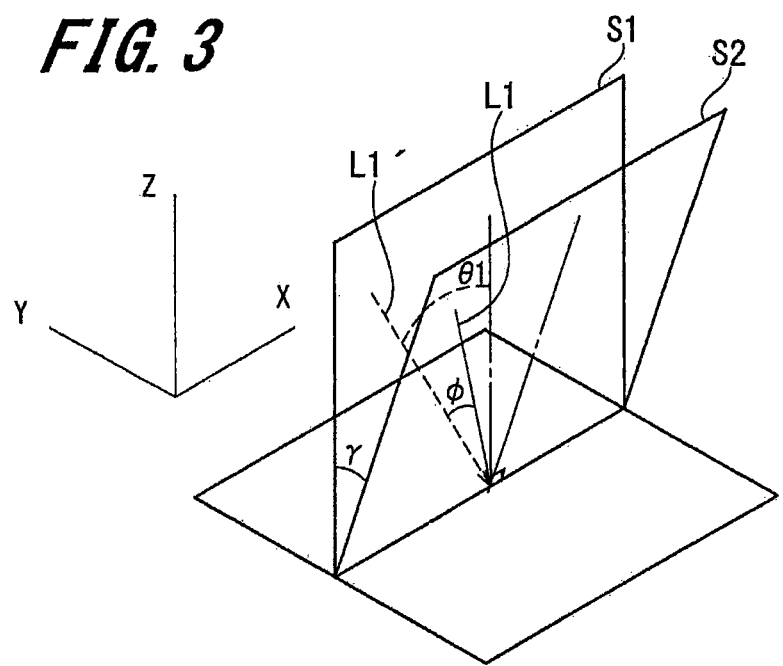
FIG. 3 is a view for explaining the angle of the light incident on a diffraction grating.

However, in the present embodiment, the first beam L1 and the second beam L2 incident on the diffraction grating 1 are inclined toward the Y-axis direction by an angle equivalent to the angle γ between the plane S2 and the plane S1, as shown in FIGS. 1 and 3. If the inclination toward the Y-axis direction becomes too large, the amount of the diffracted light will be deviated from the values shown in FIGS. 3 to 18.

Figure 19:
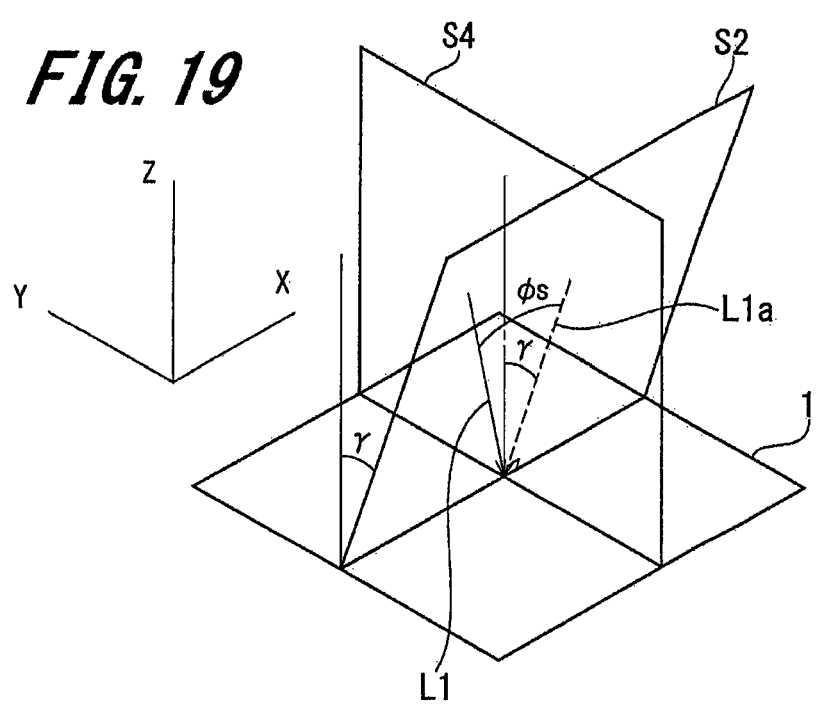
FIG. 19 is a view for explaining the angle of the light incident on the diffraction grating.

To solve such problem, as shown in FIG. 19, the incidence angle of a beam L1a, which is obtained by projecting the first beam L1 incident on the diffraction grating 1 onto a plane S4 (i.e., the Y-Z plane), is denoted as $\theta_s$ (=γ), and the angle between the first beam L1 and the plane S4 is denoted as $\Phi_s$.

At this time, in the case where 1<Λ cos $\Phi$s/λ<1.5, the value of γ may be set so that the following equation 3 is satisfied.

[Equation 3]

$$1 \geq \frac{\lambda}{\Lambda \cos\phi_s} + \sin\gamma \qquad (3)$$

When the value of γ is increased, the negative 1st-order diffracted light will not be generated in the Y-axis direction, so that only positive 1st-order diffracted light is generated in the Y-axis direction. Equation 3 indicates a range in which both the positive 1st-order light and the negative 1st-order light are generated in the Y-axis direction. Such condition was educed in the simulation results shown in FIGS. 13 to 18.

Thus, amount of the diffracted light identical to the values shown in FIGS. 13 to 18 can be obtained by setting the value of γ within the range of the equation 3 so that both the positive 1st-order light and the negative 1st-order light are generated in the Y-axis direction.

Further, in the case where $\Lambda \cos \Phi s/\lambda < 1$, the value of γ may be set so that the following equation 4 is satisfied.

[Equation 4]

$$1 \leq \frac{\lambda}{\Lambda \cos \phi_s} - \sin \gamma \quad (4)$$

In the case where $\Lambda \cos \Phi s/\lambda < 1$, i.e., in the case where the period of the diffraction grating 1 becomes small, the diffraction angle of the 1st-order diffracted light in the Y-axis direction will become large. Further, in the case where the period becomes smaller than a predetermined value, the 1st-order diffracted light will not be generated in the Y-axis direction, so that only zero-order light (i.e., the reflected light) is generated. Such condition was educed in the simulation shown in FIGS. 13 to 18.

However, if the value of γ is increased, the 1st-order diffracted light will be generated even if the period of the diffraction grating 1 is small. The equation 4 indicates a range of the angle γ at which the 1st-order diffracted light will not be generated so that only zero-order light (i.e., the reflected light) is generated even in the case where the period of the diffraction grating 1 is small; and by setting such range, a diffraction condition equivalent to the condition indicated by FIGS. 13 to 18 can be satisfied, so that the identical amount of the diffracted light can be obtained.

2. Second Embodiment

Figure 20:
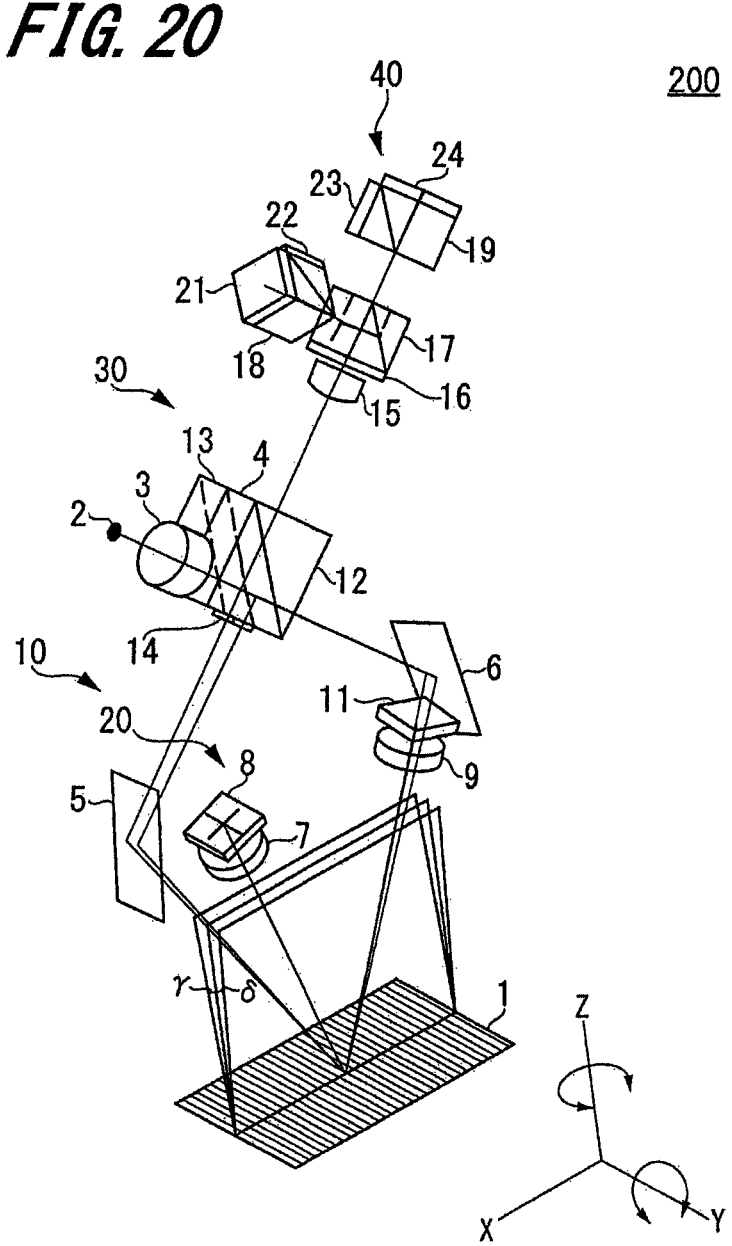
FIG. 20 is a schematic perspective view showing a signal acquiring section of a displacement detecting device according to a second embodiment of the present invention.

FIG. 20 is a perspective view showing a schematic configuration of a displacement detecting device 200 according to a second embodiment of the present invention. Note that, in the second embodiment, like parts are denoted by like reference numerals as of the first embodiment (see FIG. 1), and the explanation thereof will not be repeated.

The displacement detecting device 200 of the present embodiment includes a signal acquiring section 70 adapted to generate an interference signal and acquire the interference signal, and a position information detecting section adapted to detect the position information based on the acquired interference signal. The position information detecting section may be identical to the position information detecting section described in the first embodiment (see FIG. 6), and therefore will neither be shown in the drawings nor be described herein.

The signal acquiring section 70 includes a diffraction grating 1, an irradiation optical system 10, a reflection optical system 20, an interference optical system 30 and a light receiving section 40.

The configurations of the diffraction grating 1, the irradiation optical system 10, the interference optical system and the light receiving section 40 are essentially identical to those of first embodiment. However, in the present embodiment, the position at which the diffracted light from the diffraction grating 1 is incident again on the diffraction grating 1 by the reflection optical system 20 is different from the position at which the light is incident on the diffraction grating 1.

Figure 21:
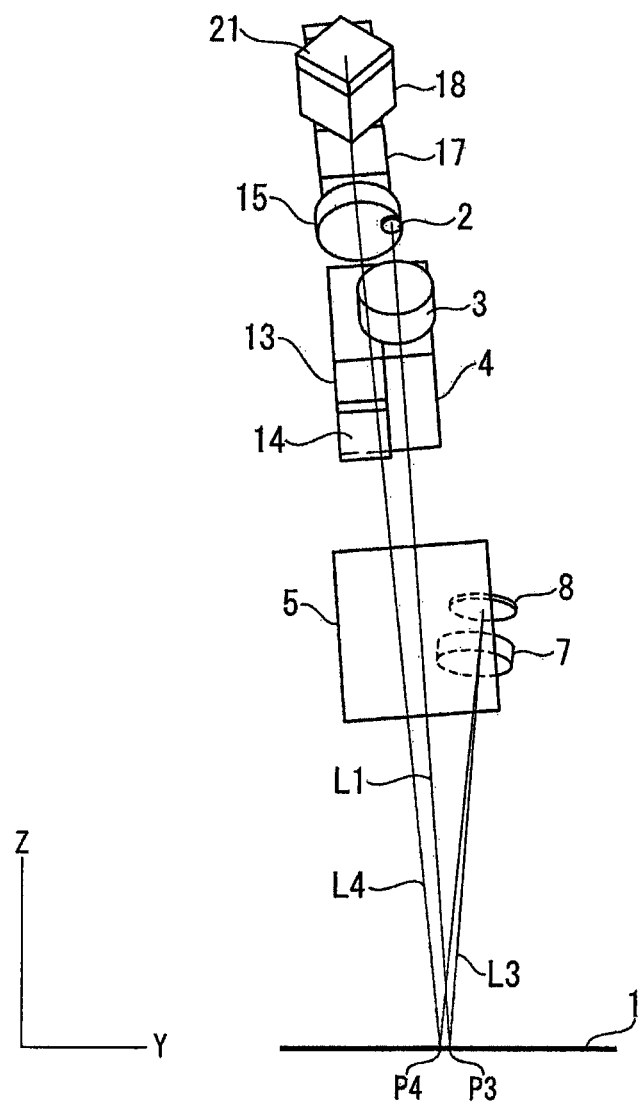
FIG. 21 is a view schematically showing the configuration of the signal acquiring section of the displacement detecting device according to the second embodiment.
Figure 22:
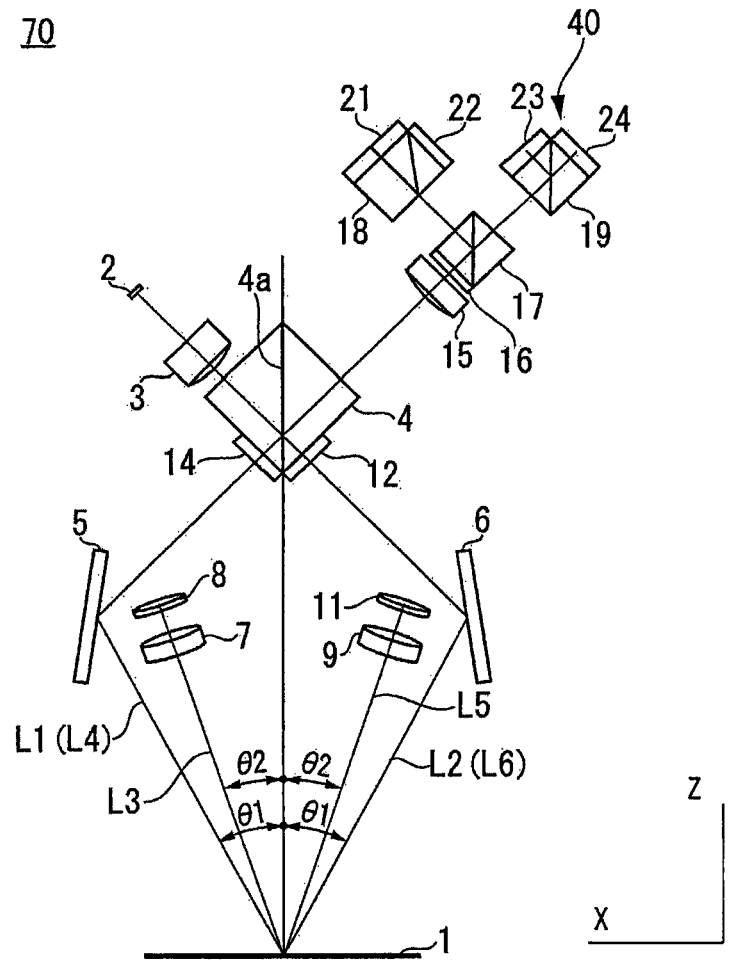
FIG. 22 is another view schematically showing the configuration of the signal acquiring section of the displacement detecting device according to the second embodiment.

FIG. 21 is a view of the signal acquiring section 70 when viewed from the X-axis direction, and FIG. 22 is a view of the signal acquiring section 70 when viewed from the Y-axis direction.

As shown in FIGS. 21 and 22, in the present embodiment, the diffracted light from the diffraction grating 1 is incident again by the reflection optical system 20 on the diffraction grating 1 at a position different in the Y-axis direction from the position at which the light is diffracted from the diffraction grating 1.

For example, as shown in FIG. 21, a first beam L1 split by a beam splitting element 4 is incident at a point P3 on the diffraction grating 1. A first diffracted light L3 generated at point P3 is transmitted through a lens 7 and then reflected by a mirror 8 so as to be incident on the diffraction grating 1 at a point P4, which is different in the Y-axis direction from the point P3.

Further, a second diffracted light L4 generated at the point P4 is reflected by a mirror 6 (not shown in the drawings) and then transmitted through a dummy glass 14 so as to be incident on a light combiner 13.

In such a manner, in the present embodiment, the optical path of the first beam L1 and the optical path of the second diffracted light L4 are shifted from each other in the Y-axis direction. Thus, the beam splitting element 4 and the light combiner 13 are superimposed on each other in the Y-axis direction, and the dummy glass 14 is only arranged on the light incident surface of the light combiner 13.

Further, as shown in FIG. 22, a second beam L2 (not shown in FIG. 21) split by the beam splitting element 4 is incident at the point P3 on the diffraction grating 1. A first diffracted light L5 generated at the point P3 is transmitted through a lens 9 and then reflected by the mirror 11 so as to be incident again on the diffraction grating 1 at the point P4.

A second diffracted light L6 generated when the light is incident again at the point P4 is reflected by the mirror 6 and transmitted through a half-wave plate 12 so as to be incident on the light combiner 13.

As shown in FIG. 22, in the present embodiment, since the point P3 and the point P4 on the diffraction grating 1, on which the light is incident, are deviated from each other in the Y-axis direction, the optical path of the first beam L1 and the optical path of the second diffracted light L4 are substantially coincident with each other when viewed from the Y-axis direction.

Further, the optical path of the second beam L2 and the optical path of the second diffracted light L6 are substantially coincident with each other when viewed from the Y-axis direction.

Further, the optical paths of the second diffracted lights L4, L6 incident on the light combiner 13 in the segment until being received by the light receiving section 40 and the method of detecting the position information based on the interference signal obtained by the light receiving section 40 are identical to those of the first embodiment.

In the present embodiment, the period of the relief of the diffraction grating 1 is also no more than 1.5 times the wavelength of the light incident on the diffraction grating 1. Further, the first beam L1 and the second beam L2 are incident on the diffraction grating 1 as p-polarized light, and the first diffracted lights L3, L5 reflected by the reflection optical system 20 are also incident on the diffraction grating 1 as p-polarized light. Thus, high diffraction efficiency as the first embodiment can be achieved and strong interference signal can be obtained, so that it is possible to perform position detection with high accuracy.

Other configurations and effects are also identical to those of the first embodiment.

For example, the method of reflecting the diffracted light incident on the reflection optical system 20 at different point on the diffraction grating 1 may also be identical to that of the first embodiment (see FIGS. 4A and 4B), i.e., shifting the optical axis of the lens 7, or tilting the mirror 8. However, the optical axis is shifted or the mirror 8 is tilted along the Y-axis direction.

Further, the focuses of the lenses 7, 9 are located on the diffraction grating 1.

Figure 23:
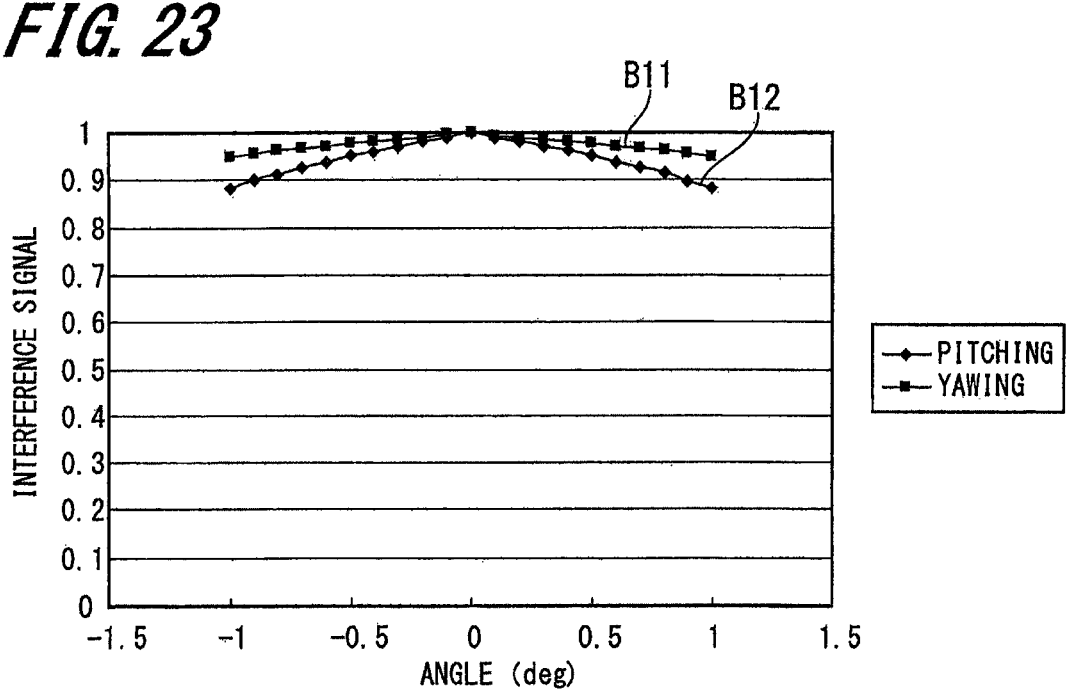
FIG. 23 is a chart for explaining the intensity of the interference signal when the diffraction grating is tilted.

FIG. 23 is a chart showing the intensity of the interference signal obtained when rotating the diffraction grating 1 of the present embodiment in a yawing direction (a direction within the surface of the diffraction grating 1, i.e., a direction within the X-Y plane in FIG. 20) and a pitching direction (a direction within the X-Z plane).

In the chart shown in FIG. 23, the horizontal axis represents the rotation angle of the diffraction grating 1, and the vertical axis represents the intensity of the interference signal. Incidentally, the intensity of the interference signal when the rotation angle is equal to zero is defined as 1, the focal length of both the lenses 7, 8 is 25 mm, and the distance between the point P3 and the point P4 is 0.6 mm.

In the yawing direction shown by curve B11, even if the rotation angle is 1 degree, the intensity of interference signal is maintained at 95% or higher compared with the case where the rotation angle is zero.

Further, in the pitching direction shown by curve B12, if the rotation angle is 1 degree, the intensity of interference signal is maintained at a rate close to 90%.

Thus, compared to FIG. 5 shown in the first embodiment, the displacement detecting device 200 of the present embodiment has larger allowable range with respect to the rotation of the diffraction grating 1.

3. Third Embodiment

Further, in the case where a two-dimensional diffraction grating is used as the diffraction grating 1, it is also possible to arrange two signal acquiring sections, which are provided corresponding to the measurement direction, so that the two signal acquiring section cross each other.

Figure 24:
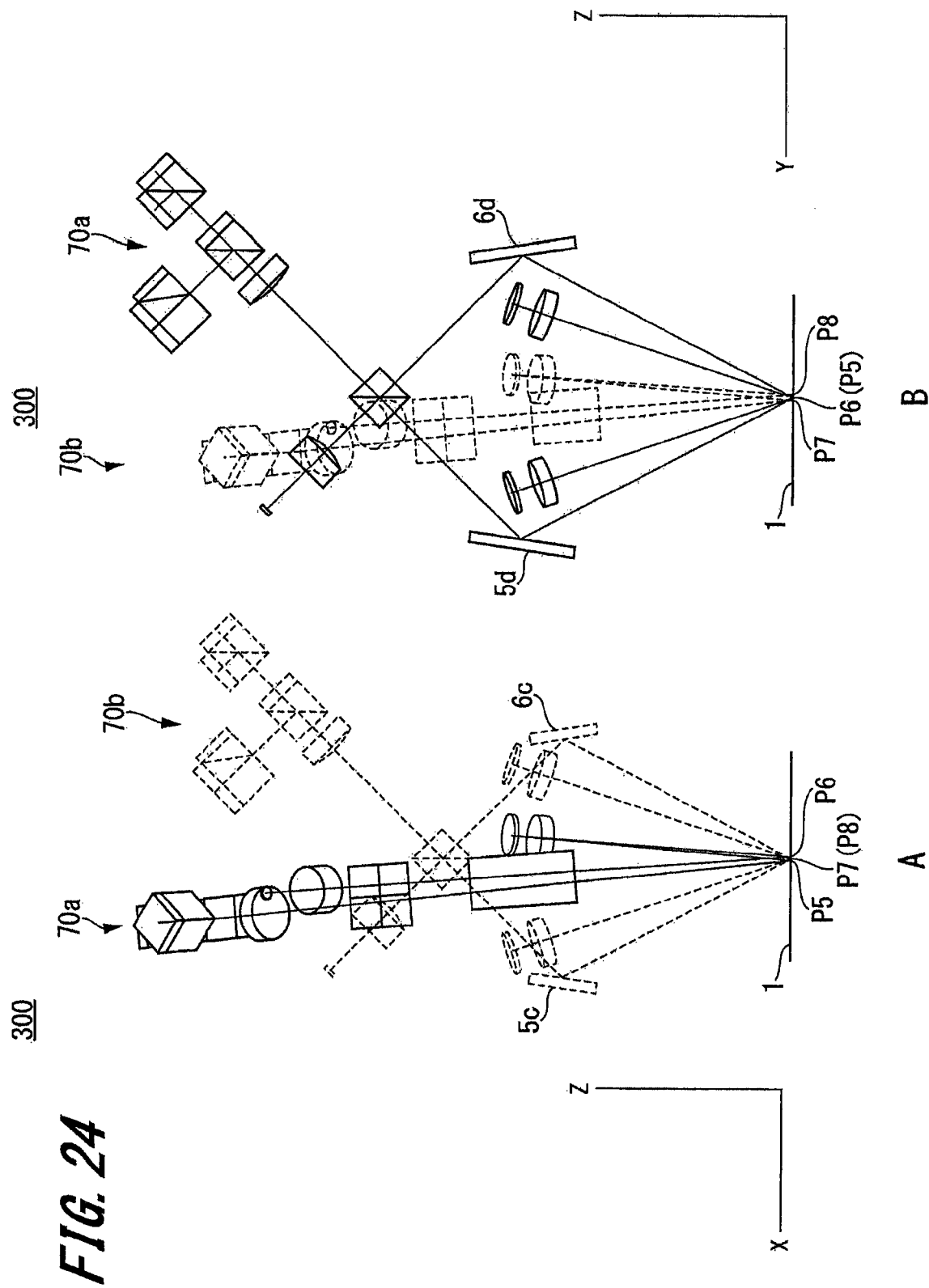
FIG. 24A and FIG. 24B are views each schematically showing the configuration of two signal acquiring sections of a displacement detecting device according to a third embodiment of the present invention.

FIG. 24A and FIG. 24B are views each schematically showing the configuration of a displacement detecting device 300 according to a third embodiment of the present invention. FIG. 24A is a view of the displacement detecting device 300 when viewed from the Y-axis direction, and FIG. 24B is a view of the displacement detecting device 300 when viewed from the X-axis direction. Note that, in the third embodiment, like parts are denoted by like reference numerals as of the first embodiment (see FIG. 1) and the explanation thereof will not be repeated.

The displacement detecting device 300 according to the present embodiment includes a diffraction grating 1, two signal acquiring section 70a, 70b, and a position information detecting section (not shown in the drawings).

The diffraction grating 1 is identical to that shown in the first embodiment (see FIGS. 9, 10 and 12). Thus, the period Λ of the relief of the diffraction grating 1 and the wavelength λ of the light is incident on the diffraction grating 1 are in a relationship so that the value of Λ/λ is no more than 1.5. Other configurations of the diffraction grating 1 are also identical to those of the first embodiment.

Further, the basic configuration of the signal acquiring sections 70a, 70b is identical to that of the signal acquiring section 70 shown in the second embodiment (see FIGS. 20, 21 and 22).

However, in the present embodiment, the signal acquiring section 70a and the signal acquiring section 70b are arranged so that they cross each other. As can be known from FIGS. 24A and 24B, for example, "the signal acquiring section 70a and the signal acquiring section 70b cross each other" means that a line connecting two mirrors 5d, 6d of the irradiation optical system of the signal acquiring section 70a and a line connecting two mirrors 5c, 6c of the irradiation optical system of the signal acquiring section 70b cross each other.

As shown in FIG. 24A, in the signal acquiring section 70a, p-polarized light is irradiated on the diffraction grating 1 at two points P5, P6 different in the X-axis direction, and the interference signal caused by the diffracted light is acquired.

Further, as shown in FIG. 24B, in the signal acquiring section 70b, p-polarized light is irradiated on the diffraction grating 1 at two points P7, P8 different in the Y-axis direction, and the interference signal caused by the diffracted light is acquired.

Figure 25:
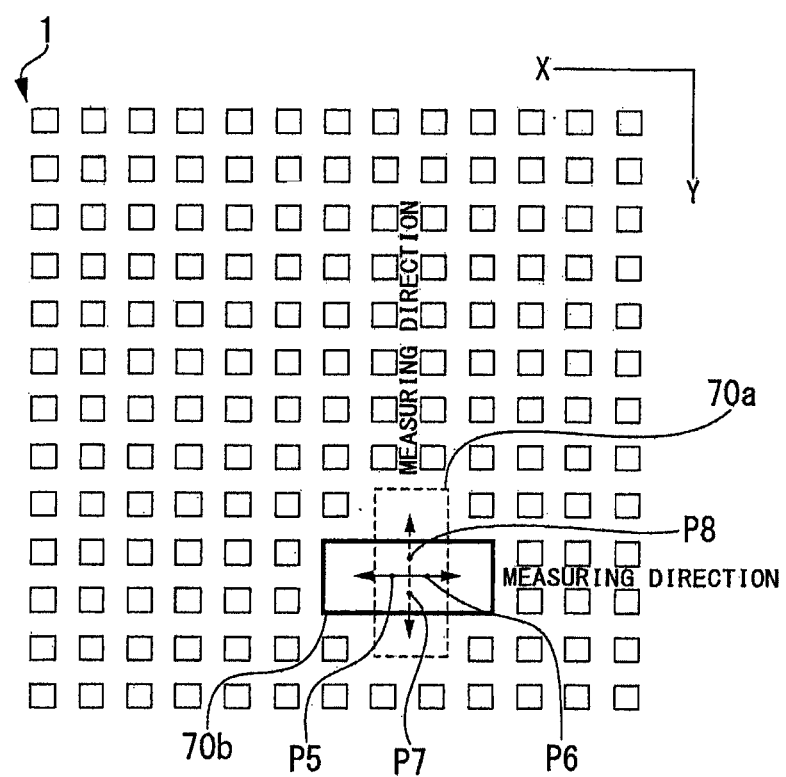
FIG. 25 is a view for explaining positions at which light is irradiated by the two signal acquiring sections.

In other words, as shown in FIG. 25, when viewing the diffraction grating 1 from the Z-axis direction, a line connecting the two points P5, P6 at which the light is irradiated by the signal acquiring section 70a and a line connecting the two points P7, P8 at which the light is irradiated by the signal acquiring section 70b cross each other. Particularly, in the present embodiment, the signal acquiring sections 70a, 70b are arranged so that the centers of the two line segments are superimposed on each other.

The signal acquiring section 70a acquires the interference signal from the points P5, P6, and a position information detecting section (not shown in the drawings) detects the position information in the X-axis direction based on the interference signal.

Similarly, the signal acquiring section 70b acquires the interference signal from the points P7, P8, and a position information detecting section (not shown in the drawings) detects the position information in the Y-axis direction based on the interference signal. The position information detecting section 60 may be identical to the position information detecting section described in the first embodiment (see FIG. 6), and is, for example, connected to the signal acquiring sections 70a, 70b respectively. However, the present invention also includes a possible configuration in which a digital signal processing section 33 is employed to process the signal of both the signal acquiring section 70a and the signal acquiring section 70b.

For example, as shown in FIG. 10, if the distance between the signal acquiring section 50a and the signal acquiring section 50b is increased, the distance between the light irradiation point on the diffraction grating 1 caused by the signal acquiring section 50a and the light irradiation point on the diffraction grating 1 caused by the signal acquiring section 50b will increase.

In the diffraction grating 1, if the position for measuring the displacement in the X-axis direction is largely different from the position for measuring the displacement in the Y-axis direction, it will be difficult to perform accurate displacement detection in the case where the diffraction grating 1 is tilted in the pitching direction, for example.

In contrast, in the present embodiment, by arranging the two signal acquiring sections 70a, 70b so that they cross each other, the light irradiation points P5, P6, P7, P8 on the diffraction grating 1 can be brought close to each other. Thus, it is possible to perform accurate displacement detection with small error.

In the present embodiment, the period of the relief of the diffraction grating 1 is also no more than 1.5 times the wavelength of the light incident on the diffraction grating 1. Further, since the light incident on the diffraction grating 1 is constantly incident on the diffraction grating 1 as p-polarized light, stronger interference signal can be obtained as the first embodiment. Thus, it is possible to perform two-dimensional position detection with high accuracy.

Other configurations and effects are also identical to those of the first embodiment.

Incidentally, in the present embodiment, signal acquiring sections having the same basic configuration as that of the signal acquiring section of the second embodiment are used as the signal acquiring sections 70a, 70b; however, it is also possible to configure the present embodiment in the same manner even if the signal acquiring section of the first embodiment is used as the signal acquiring sections 70a, 70b.

The preferred embodiments of the displacement detecting device have been described above. It is to be understood that the present invention is not limited to the embodiments described above, and various possible modifications can be made without departing from the spirit and scope of the present invention.

What is claimed is:

1. A displacement detecting device comprising:
a diffraction grating having a trapezoidal or rectangular relief shape;
an irradiation optical system having a light source section configured by a laser diode or a super luminescent diode for emitting coherent light, a lens to cause the coherent light emitted from the light source section to form an image on the diffraction grating, a non-polarizing beam splitter for splitting the light emitted from the light source section into two beams, and two mirrors adapted to reflect the two beams to the diffraction grating, respectively, and adapted to irradiate the two beams onto the diffraction grating as p-polarized light, respective, by rotating the light source section with an optical axis of the emitted light as a rotation center;
a reflection optical system that includes two lenses each having a focus position on the diffraction grating, and two mirrors arranged such that two first diffracted lights obtained from the two beams through diffracted by the diffraction grating and passed the lenses are perpendicularly incident thereon, respectively, the reflection optical system being adapted to reflect the two first diffracted lights, and cause the two first diffracted lights to be incident again on the diffraction grating as p-polarized light, respectively;
an interference optical system that includes a half-wave plate and a light combiner comprising a polarizing beam splitter, the interference optical system being adapted to cause two second diffracted lights obtained from the two first diffracted lights incident again on the diffraction grating through diffraction by the diffraction grating and reflected by the two mirrors of the irradiation optical system, to interfere with each other so as to obtain interference light, one of the two second diffracted lights being rotated 90 degrees with respect to a polarization direction thereof so as to be s-polarized light by passing the half-wave plate and reflected by the light combiner, and the other of the two second diffracted lights passing the light combiner as p-polarizing light, thereby being combined with each other to be the interference light, the interference optical system including a quarter-wave plate that makes the two second diffracted lights combined with each other by the light combiner to circularly polarized lights with mutually reversed rotational directions, a non-polarizing beam splitter that splits the combined two second diffracted lights into two beams, and two polarizing beam splitters that respectively split each incident beam of the two beams, obtained by splitting the combined two second diffracted lights, into an s-polarized component and a p-polarized component;
a light receiving section that includes photodiodes, the light receiving section being adapted to receive the interference light obtained in the interference optical system, the photodiodes respectively receiving the s-polarized and p-polarized components of the two beams, obtained by splitting the combined two second diffracted lights in the interference optical system, and obtaining respective current signals; and
a position information detecting section having I/V converters that convert the current signals obtained by the photodiodes into voltage signals, amplifiers that amplify the voltage signals converted by the I/V converters, A/D converters that convert the amplified voltage signals to digital signals, and a processor that processes the inputted digital signals and outputs the processed signals as two phase increment signals, the position information detecting section being adapted to detect position information of the diffraction grating based on the two phase incremental signals, wherein:
a periodic structure of the relief of the diffraction grating is no more than 1.5 times a wavelength of the coherent light incident on the diffraction grating, and $D/\Lambda=0.7$-$0.9$ when $\Lambda$ represents a period of a relief of the diffracted grating and D represents a width of a projection of the diffraction grating,
the periodic structure of the relief is formed in a two-dimensional direction, and the irradiation optical system, the reflection optical system, the interference optical system, the light receiving section and the position information detecting section are provided for each direction of the two-dimensional direction,
the reflection optical system causes the first diffracted lights diffracted by the diffraction grating to be incident again so as to form an image at a position different from the position at which the two beams are incident on the diffraction grating, and
the irradiation optical system, the reflection optical system, the interference optical system, and the light receiving section provided for each direction of the two-dimensional direction are arranged so that a line connecting two points different in one direction of the two-dimensional direction, at which light is irradiated by the irradiation optical system and the reflection optical system provided for the one direction of the two-dimensional direction and a line connecting two points different in the other direction of the two dimensional direction, at which light is irradiated by the irradiation optical system and the reflection optical system provided for the other direction of the two-dimensional direction, cross each other.

* * * * *